(12) United States Patent
Hamashima et al.

(10) Patent No.: US 8,139,262 B2
(45) Date of Patent: Mar. 20, 2012

(54) IMAGE OUTPUT APPARATUS AND IMAGE OUTPUT METHOD FOR PRINTING OUT THE PHOTOGRAPHED IMAGE WHICH IS CAPTURED BY A DIGITAL CAMERA

(75) Inventors: Mitsuhiro Hamashima, Tokyo (JP); Jun Yoshida, Tokyo (JP); Naoji Shibasaki, Tokyo (JP); Yasuko Deushi, Tokyo (JP); Nobuho Mori, Tokyo (JP)

(73) Assignee: Dai Nippon Printing Co., Ltd. (JP)

( * ) Notice: Subject to any disclaimer, the term of this patent is extended or adjusted under 35 U.S.C. 154(b) by 1469 days.

(21) Appl. No.: 10/573,334

(22) PCT Filed: Sep. 22, 2004

(86) PCT No.: PCT/JP2004/013799
§ 371 (c)(1),
(2), (4) Date: Apr. 25, 2006

(87) PCT Pub. No.: WO2005/031559
PCT Pub. Date: Apr. 7, 2005

(65) Prior Publication Data
US 2007/0136208 A1    Jun. 14, 2007

(30) Foreign Application Priority Data

Sep. 25, 2003   (JP) ................................. 2003-333890
Sep. 25, 2003   (JP) ................................. 2003-333924
Sep. 26, 2003   (JP) ................................. 2003-335390

(51) Int. Cl.
*G06F 15/00*  (2006.01)
*H04N 5/44*   (2011.01)

(52) U.S. Cl. ...... 358/1.9; 358/1.15; 358/1.11; 358/1.12; 358/1.14; 358/1.13; 358/1.16; 358/1.17; 358/1.18; 358/1.6; 358/487; 382/112; 382/144; 382/130; 382/164; 382/166; 382/171; 382/216; 348/158; 348/211.8; 348/64; 348/143; 348/376; 348/335; 348/333.01; 348/373; 348/77; 355/35; 355/40; 355/93; 355/122; 355/126; 396/1; 396/2; 396/38; 396/46; 396/116; 396/118; 396/128; 396/216; 396/228; 396/239; 396/243; 396/562; 396/568; 396/570

(58) Field of Classification Search .................. 358/1.6, 358/1.9, 487, 1.11–1.18; 705/62, 54, 14, 705/26, 401; 348/158, 211.8, 64, 143, 376, 348/335, 333.01, 373, 77; 355/35, 40, 48, 355/93, 122, 126; 396/1.2, 116, 123, 128, 396/216, 228, 239, 243
See application file for complete search history.

(56) References Cited

U.S. PATENT DOCUMENTS 5,115,477 A * 5/1992 Groezinger ................... 382/199
(Continued)

FOREIGN PATENT DOCUMENTS

JP   64-29974 A   1/1989
(Continued)

OTHER PUBLICATIONS

Shibazaki Naoji, Management System for Image Data, Sep. 29, 2000, Patent Abstracts of Japan, Publication No. 2000-270149.*

(Continued)

*Primary Examiner* — Steven Kau
(74) *Attorney, Agent, or Firm* — Rossi, Kimms & McDowell LLP

(57) ABSTRACT

A terminal 102 creates setting data 400 and inputs setting data 400 into an image output apparatus 101. The image output apparatus 101 sets the initial settings, operation settings, equipment settings, etc. based on the setting data, holds the setting data, and performs various processes based on the set settings and the held setting data. In addition, the image output apparatus 101 performs a media identification process, a media reader switching process, and the like using a media detection means 117, a media reader switching means 118, and the like, and allows only the use of the insertion opening of a predetermined media reader.

2 Claims, 32 Drawing Sheets

U.S. PATENT DOCUMENTS

| | | | |
|---|---|---|---|
| 5,513,013 A | 4/1996 | Kuo | |
| 5,598,279 A | 1/1997 | Ishii et al. | |
| 5,734,482 A | 3/1998 | Miyamoto et al. | |
| 6,111,586 A * | 8/2000 | Ikeda et al. | 345/619 |
| 6,195,470 B1 * | 2/2001 | Sasaki et al. | 382/277 |
| 6,636,837 B1 * | 10/2003 | Nardozzi et al. | 705/27 |
| 6,745,186 B1 * | 6/2004 | Testa et al. | 707/7 |
| 7,130,067 B1 * | 10/2006 | Shibasaki | 358/1.15 |
| 7,301,664 B2 | 11/2007 | Freeny et al. | |
| 2001/0034648 A1 * | 10/2001 | Caldwell | 705/14 |
| 2002/0063797 A1 * | 5/2002 | Aratani et al. | 348/553 |
| 2002/0109682 A1 * | 8/2002 | Nash et al. | 345/418 |
| 2005/0063001 A1 | 3/2005 | Tanimoto | |
| 2005/0128514 A1 | 6/2005 | Wanda et al. | |
| 2007/0076255 A1 | 4/2007 | Hamashima et al. | |

FOREIGN PATENT DOCUMENTS

| | | |
|---|---|---|
| JP | 64-033693 A | 2/1989 |
| JP | 5-128166 A | 5/1993 |
| JP | 5-316334 A | 11/1993 |
| JP | 7-285245 A | 10/1995 |
| JP | 8-314945 A | 11/1996 |
| JP | 10-157252 A | 6/1998 |
| JP | 10-226115 * | 8/1998 |
| JP | 11-088577 A | 3/1999 |
| JP | 11-91172 A | 4/1999 |
| JP | 11-219441 A | 8/1999 |
| JP | 11-320987 A | 11/1999 |
| JP | 11-321016 A | 11/1999 |
| JP | 11-321017 A | 11/1999 |
| JP | 11-321018 A | 11/1999 |
| JP | 11-321019 A | 11/1999 |
| JP | 11-321020 A | 11/1999 |
| JP | 11-321021 A | 11/1999 |
| JP | 11-345242 A | 12/1999 |
| JP | 2000-35968 A | 2/2000 |
| JP | 2000-152168 A | 5/2000 |
| JP | 2000-215322 A | 8/2000 |
| JP | 2000-270149 A | 9/2000 |
| JP | 2000-293528 A | 10/2000 |
| JP | 2000-299777 A | 10/2000 |
| JP | 2000-357038 A | 12/2000 |
| JP | 2001-94745 A | 4/2001 |
| JP | 2001-229176 A | 8/2001 |
| JP | 2001-277644 A | 10/2001 |
| JP | 2001-312390 A | 11/2001 |
| JP | 2001-353920 A | 12/2001 |
| JP | 2001-356894 A | 12/2001 |
| JP | 2002-006418 A | 1/2002 |
| JP | 2002-16789 A | 1/2002 |
| JP | 2002-046324 A | 2/2002 |
| JP | 2002-57820 A | 2/2002 |
| JP | 2002-92350 A | 3/2002 |
| JP | 2002-104713 A | 4/2002 |
| JP | 2002-149354 A | 5/2002 |
| JP | 2002-258831 A | 9/2002 |
| JP | 2002-271810 A | 9/2002 |
| JP | 2002-318421 A | 10/2002 |
| JP | 2002-329250 A | 11/2002 |
| JP | 2003-78742 A | 3/2003 |
| JP | 2003-085454 A | 3/2003 |
| JP | 2003-91545 A | 3/2003 |
| JP | 2003-91715 A | 3/2003 |
| JP | 2003-150330 A | 5/2003 |
| JP | 2003-223347 A | 8/2003 |
| JP | 2003-233491 A | 8/2003 |
| JP | 2003-242178 A | 8/2003 |
| JP | 2003-256838 A | 9/2003 |
| JP | 2003-260846 A | 9/2003 |
| JP | 2003-260848 A | 9/2003 |
| JP | 2004-330544 A | 11/2004 |

OTHER PUBLICATIONS

Japanese Patent Office, "Notification of Reasons for Refusal", Japanese Patent Appln. No. 2003-335390, Aug. 4, 2009, (Partial Translation).

Notification of Reasons for Refusal issued in corresponding Japanese Patent Application No. 2003-333924 dated Sep. 29, 2009. Partial English translation provided.

Communication from JPO issued in Priority Document JP2003-333890, dated Feb. 2, 2007.

Communication from JPO issued in Priority Document JP2003-333924, dated Feb. 2, 2007.

Communication from JPO issued in a priority document of the related co-pending application: JP2003-355220, dated Dec. 19, 2006.

Communication from JPO issued in a priority document of the related co-pending application: JP2003-379438, dated Jan. 16, 2007.

Relevant portion of International Search Report of corresponding PCT Application PCT/JP2004/013799, Nov. 26, 2004.

Mar. 25, 2008 Office action issued in Japanese patent application No. 2003-355220, which corresponds to related co-pending U.S. Appl. No. 10/576,232.

Apr. 1, 2008 Office action issued in Japanese patent application No. 2003-379438, which corresponds to related co-pending U.S. Appl. No. 10/576,232.

Apr. 1, 2008 Office action issued in Japanese patent application No. 2003-380219, which corresponds to related co-pending U.S. Appl. No. 10/576,232.

Notification of Reasons of Refusal issued in corresponding Japanese patent application No. 2003-333890, dated Aug. 12, 2008.

Office Action issued in Japanese patent application No. 2003-355220, dated Jun. 17, 2008, which corresponds with co-pending U.S. Appl. No. 10/576,232.

Office Action issued in Japanese patent application No. 2003-379438 dated Jun. 24, 2008, which corresponds with co-pending U.S. Appl. No. 10/576,232.

Relevant portion of International Search Report, dated Feb. 8, 2005, PCT Application JP2004-015166, which corresponds with related co-pending U.S. Appl. No. 10/576,232.

Notification of Reasons for Refusal dated Feb. 6, 2009, issued in corresponding Japanese Patent Application No. 2003-333890.

Office action issued in related co-pending U.S. Appl. No. 10/576,232, corresponding to Japanese patent application No. 2003-355220, dated Mar. 25, 2008.

Office action issued in corresponding Japanese patent application No. 2003-379438, dated Apr. 1, 2008.

Office action issued in corresponding Japanese patent application No. 2003-380219, dated Apr. 1, 2008.

* cited by examiner

FIG.4

400 SETTING DATA

| SETTING ITEM | SETTING DETAILS |
|---|---|
| 411 USE OF EXIF INFORMATION | USE/DO NOT USE |
| 412 SUBJECTS OF OPERATIONAL INSTRUCTION BY BATCH BUTTON | ALL IMAGES/ DISPLAYED IMAGE ONLY |
| 413 TAX RATE | 5% |
| 414 TAXATION METHOD | TAX-INCLUSIVE/TAX-EXCLUSIVE |
| 415 TAX AMOUNT DISPLAY | DISPLAY ON SCREEN/ DO NOT DISPLAY ON SCREEN |
| ⋮ | ⋮ |
| 416 TEMPORARY DISPLAY OF EXIF REDUCED IMAGE DATA | DISPLAY TEMPORARILY/ DO NOT DISPLAY TEMPORARILY |
| 417 MONITOR RESOLUTION | 1280×1024 (5:4) /1024×768 (4:3) |
| 418 IMAGE CORRECTION PATTERN | IMAGE CORRECTION VALUES (SUNSET, NIGHT VIEW, PORTRAIT, INDOORS, ETC.) |
| ⋮ | ⋮ |

MEDIA READER SWITCHING DEVICE
2501

COVER PLATE 2601
HOLE 2602
INSERTION OPENING 2603

US 8,139,262 B2

IMAGE OUTPUT APPARATUS AND IMAGE OUTPUT METHOD FOR PRINTING OUT THE PHOTOGRAPHED IMAGE WHICH IS CAPTURED BY A DIGITAL CAMERA

This application is a U.S. National Phase Application of PCT International Application PCT/JP2004/013799 filed on Sep. 22, 2004.

TECHNICAL FIELD

The present invention relates to an image output apparatus which can print out images photographed with a digital camera, images read by a scanner, image data recorded on a recording medium which has been brought in, image data stored in the apparatus device in advance and the like, as well as images obtained through composition and/or editing of the above described images.

BACKGROUND ART

In recent years, image output apparatuses (digital photograph printing devices, etc.) have been placed and used in stores and on streets as street terminals (KIOSK terminals). These image output apparatuses read images shot with a digital camera or the like, image data recorded on a recording medium, and the like, and perform image editing, image composition, printout, etc. (refer to, for example, [Patent Document 1] and [Non-Patent Document 1]).

Image output apparatuses are placed in identification photograph photographing corners near train stations, amusement facilities such as game arcades, and the like. A user brings a recording medium on which image data taken with the user's own digital camera are recorded and loads these images into the image output apparatus, or takes a photograph on site. Then, the user can perform an image editing process and the like as required, and specify output size, the number of outputs, etc. so as to output high-resolution color prints, which the user can take home.

In addition, image display and image selection are performed in the image output apparatus as follows. When a recording medium on which images are recorded is inserted into a media reader, the image output apparatus generally displays a list of images through a plurality of thumbnail images or the like. Then, the user selects the image to be printed out from this image list.

In addition, image correction and image adjustment are performed with an image retouching software or the like which operates on a personal computer. Adjustments can be made automatically based on the coloring of the overall image. Alternatively, the user manually adjusts color balance and tone curves of respective colors while viewing a monitor.

In addition, with regards to image data input, there are image output apparatuses which comprise a photographing function using a digital camera or the like. These image output apparatuses can process image data photographed on-site as input data. Furthermore, an automatic photograph sticker vending machine comprising a translucent curtain to ensure a private photographing environment and enhance photogenic effect and security has been proposed (refer to, for example, [Patent Document 2]).

Patent Document 1: Japanese Patent Application Laid-Open (kokai) No. 2002-46324
Patent Document 2: Japanese Patent Application Laid-Open (kokai) No. 2002-318421

Non-Patent Document 1: Dai Nippon Printing Co., Ltd., "*Dejitaru-camera no susume*", [online], [searched on Dec. 1, 2002], http://www.digicamates.com/susume/index.html

DISCLOSURE OF THE INVENTION

Problems to be Solved by the Invention

However, although the conventional image output apparatus can perform a wide variety of processes as described above, at the same time, it is problematic in that changing of setting is difficult and the user (operator, etc.) experiences annoyance and inconvenience when operating the device.

In addition, the user performs operations such as enlargement, reduction, movement, rotation, and inversion of image data when processing image data by an editing process, a composition process, and the like. However, this is problematic in that the operability of these operations in the conventional image output apparatus is poor; for example, (1) the image can be moved even when the entire image has gone over a predetermined frame indicating a printout area, or the image can only be moved over a distance of about half the size of the image; (2) the point of origin for rotation, inversion, enlargement, reduction, and the like is fixed; and (3) the image remains in its original position even when the entire image has gone over the abovementioned frame as a result of rotation, inversion, or reduction.

In addition, when image correction and image adjustment are performed on an image data using conventional image retouching software, this is problematic in that difficult operations requiring skill are necessary, and a considerable burden of effort and time is placed on the user.

In addition, when image adjustment is performed automatically based on the entire image, this is problematic in that adjustments are not made to the user's wishes.

Furthermore, in the conventional image output apparatus, if the user has little knowledge of digital cameras, recording media, and the like, this is problematic in that the user becomes confused with only the instructions displayed on the screen and it is difficult to prevent the occurrence of operational errors.

For example, there is a wide variety of recording media, such as CompactFlash®, SmartMedia, Memory Sticks, SD cards, XD cards, PC cards, Floppy® disks, and optical disks (CD-ROM, etc.) Some users may not be able to differentiate between these types immediately, thus preventing smooth use of the image output apparatus.

In addition, when the image output apparatus is used as a street terminal (KIOSK terminal), this is problematic in that there are instances when whether the image output apparatus is in use cannot be determined from the outside because the interior is blocked by a curtain or the outer walls of the housing of the image output apparatus.

The technology described in [Patent Document 2] implements a translucent curtain. This is problematic in that visibility through this translucent curtain varies significantly according to the condition of external light (daytime, nighttime, etc.). Therefore, the situation behind the curtain may be unknown and the state of use is difficult to ascertain, or a private environment may not be secured, because the area behind the curtain can be viewed clearly from the outside.

The present invention was achieved in view of the abovementioned problems. An object of the present invention is to provide an image output apparatus and the like which can enhance operational flexibility by enabling switching of various settings, prevent the occurrence of unexpected situations due to false recognition and operational errors, and in addition, improve operability, facilitate smooth use and the like.

Means for Solving the Problems

In order to achieve the foregoing object, a first invention is an image output apparatus comprising input element for inputting an image data; output element for printing out the image data; and setting element for performing setting in relation to whether or not attribute information held by the image data is used.

The image output apparatus of the first invention sets the setting for whether or not attribute information held by an image data is used, and displays and prints out the image data based on this setting.

In addition, when set so that the attribute information is used, the sequence of the image data can be decided according to the date and time information held by the attribute information. When set so that the attribute information is not used, the sequence of the image data can be decided according to the date and time of creation or the date and time of update of the image data.

The attribute information may be implement EXIF information if the image format type of the image data is an EXIF (Exchangeable Image File Format).

A second invention is an image output apparatus comprising input element for inputting an image data; output element for printing out the image data; and setting element for performing setting in relation to subjects of a batch instruction.

The image output apparatus of the second invention sets the setting for subjects of a batch instruction and prints out the image data, etc., based on this setting.

In addition, when the batch instruction is related to the increase/decrease/clearing of the number of printouts, the subjects of the batch instruction can be only the displayed image data or all image data, to which the batch instruction is applied.

A third invention is an image output apparatus comprising input element for inputting an image data; output element for printing out the image data; and setting element for performing setting in relation to charging display.

The image output apparatus of the third invention sets the setting for an account display and prints out the image data, etc., based on this setting.

In addition, the setting for the charging display can include at least one of a tax rate, a taxation method, and presence/absence of tax amount display.

The image output apparatuses of the first to third inventions can configure the setting for whether or not attribute information is used, the setting for the subjects of operational instruction by the batch button, the setting for tax display, tax calculation, etc., based on the system environment, the wishes of the manager, installer, operator, user, and the like. Therefore, the operational flexibility of the image output apparatus can be enhanced and the operability thereof can be improved, as well.

In addition, a fourth invention is an image output apparatus comprising input element for inputting an image data; output element for printing out the image data; and enlarged display setting element for performing setting in relation to whether or not a reduced image data is enlarged and displayed during a transition from a simplified image display based on reduced image data to a detailed image display based on actual image data.

The image output apparatus of the fourth invention sets the setting for whether or not reduced image data is enlarged and displayed during the transition from a simplified image display of reduced image data to a detailed image display of actual image data, and displays and prints out the image data based on this setting.

The reduced image data may be EXIF thumbnail data if the image format type of the image data is an EXIF (Exchangeable Image File Format).

A fifth invention is an image output apparatus comprising input element for inputting an image data; output element for printing out the image data; and resolution setting element for setting the resolution of a display device which displays the image data.

The image output apparatus of the fifth invention sets the resolution of a display device which displays the image data and displays the image data, etc., based on this setting.

The image output apparatus of the fourth invention and the fifth invention can configure the setting for whether or not EXIF reduced image data is temporarily displayed during a switching process from a simplified display to a detailed display, the setting for monitor resolution, etc., based on the system environment, the wishes of the manager, installer, operator, user, and the like. Thus, the operational flexibility of the image output apparatus can be enhanced and the operability thereof can be improved, as well.

A sixth invention is an image output apparatus comprising input element for inputting an image data; output element for printing out the image data; image correction value holding element for holding in a memory device an image correction value (an image correction attribute, etc.) for each pattern; and image correction element for retrieving the image correction value corresponding to a designated pattern from the memory device, correcting the image data, and displaying the corrected image data.

The image output apparatus of the sixth invention holds in a memory device an image correction value for each pattern (shot, situation, scene, etc.). When a pattern is designated by a user, the image output apparatus retrieves from the memory device an image correction value corresponding to the designated pattern, performs image correction based on the image correction value, and performs processes for display, printout, and the like.

The image output apparatus of the sixth invention holds the image correction value settings for each image correction pattern in advance and performs image correction based on the image correction value set and held in advance when an image correction pattern is designated. Thus, the operational load of image correction placed on the user can be reduced.

A seventh invention is an image output apparatus comprising input element for inputting an image data; output element for printing out the image data; reference pixel designation element for designating a reference pixel to be achromatic; element for calculating the difference between the color data of the reference pixel and achromatic data; and image adjustment element for performing image adjustment on the entire image data based on the difference and for displaying the adjusted image data.

When a user designates a reference pixel to be achromatic, the image output apparatus of the seventh invention calculates the difference between achromatic data and the color data of the reference pixel, performs image adjustment to the entire image data based on the difference, and performs processes for display, printout, and the like.

In the seventh invention, the user only designates the reference pixel to be achromatic (gray), and the image output apparatus performs white-balance adjustment for the entire original image based on the color difference between the reference pixel data and the true achromatic pixel data. Thus, the operational load of white-balance adjustment placed on the user is reduced and the desired color adjustment can be realized.

An eight invention is an image output apparatus comprising input element for inputting an image data; output element for printing out the image data; processing element for processing the image data; and origin point setting element for setting at least one of a point of origin for rotation, a point of origin for an inversion process, a point of origin for an enlargement process, and a point of origin for a reduction process.

The image output apparatus of the eighth invention sets the point of origin for the rotation process, the inversion process, the enlargement process, the reduction process, etc. of the image in the processing process of the image data (for example, the center of an image, an edge of an image, the apex of an image, etc.).

A ninth invention is an image output apparatus comprising input element for inputting an image data; output element for printing out the image data; and processing element for processing the image data; wherein the image data can be moved within a range wherein at least a part of the image data is present within a printout area.

The image output apparatus of the ninth invention enables an image to be moved to a position wherein the printout area and the image area barely circumscribe.

A $10^{th}$ invention is an image output apparatus comprising input element for inputting an image data; output element for printing out the image data; processing element for processing the image data; and moving element for moving the image data to a position wherein at least a part of the image data is present within a printout area, when the entire image data goes over the printout area.

The image output apparatus of the $10^{th}$ invention moves the image data to a position wherein the printout area and the image area barely circumscribe, when the entire image goes over the printout area as a result of image data processing (reduction, rotation, inversion, etc.).

When an image goes over the frame (printout area, etc.) during movement thereof, the image output apparatuses of the $8^{th}$ invention to the $10^{th}$ invention can move the image to an inside point near the edge. The image output apparatus can also set the center of rotation and inversion (for example, the center, the upper-left, each side, an arbitrary point, etc. of the image) and the points of origin for enlargement and reduction (for example, the center, the upper-left, each side, an arbitrary point, etc. of the image). If the entire image goes over the frame as a result of rotation, inversion, reduction, and the like, the image can be moved to the frame position automatically. Thus, the operability of the image manipulation screen during the image editing process, the composition process, and the processing process can be enhanced.

In addition, an $11^{th}$ invention is an image output apparatus comprising input element for inputting an image data from a recording medium by a reading device provided for each recording medium type; output element for printing out the image data; selection element for selecting a recording medium type; and switching element for switching the reading device according to the selected recording medium type.

The image output apparatus of the $11^{th}$ invention comprises a reading device for each recording medium type and switches to the reading device corresponding to the recording medium type when a recording medium is attached.

The recording medium (media) is a recording medium for recording image data; for example, Smart Media, Compact-Flash® cards (CF cards), Floppy® disks, PC cards, optical disks (CD-ROM, etc.), and the like.

The reading device (media reader) is a device for reading image data from a recording medium; for example, recording medium data input devices such as various card readers and various drive devices. The reading device may have not only an input (reading) function, but also an output (writing) function and the like.

The recording medium type can be selected directly by the user. Alternatively, the shape of the media (outer image) or identifying information (barcode information, etc.) attached to the media can be acquired by a camera, sensor, or the like and the media type can be identified based on media identification data. Furthermore, the media type can be identified from an image data recording device (digital camera model, etc.) specified by the user.

The medium identification data is information which correlates the medium type with the shape of the medium (outer image), identifying information attached to the medium (barcode information, etc.), image data recording device (the model of the digital camera owned by the user), and the like.

In addition, the reading device can be switched by driving at least one of a cover plate, which has one hole and is provided in front of the insertion opening of each reading device, and a support member for supporting each reading device integrally. Then, the insertion opening of the reading device corresponding to the recording medium type is placed at the position of the hole.

In addition, the reading device can also be switched by the opening and closing of an open and close cover provided for each reading device, and thereby opening and closing the insertion opening of the reading device corresponding to the recording medium type.

In the $11^{th}$ invention, the image output apparatus switches the recording medium reading device and allows only the use of the insertion opening of the selected recording medium. Therefore, the user can be accurately guided to the insertion opening for the selected recording medium. Insertion error of the recording medium, damage to the reading device and the recording medium due to insertion error, accidents such as deletion of data, and the occurrence of unexpected situations can be prevented. In addition, operability can be improved and smooth-use facilitated.

A $12^{th}$ invention is an image output apparatus comprising input element for inputting an image data from a recording medium by a reading device provided for each recording medium type; output element for printing out the image data; detection element for detecting the size of the recording medium; and warning element for giving off a warning when a recording medium which is smaller than the size of the insertion opening is detected in the vicinity of the insertion opening of the reading device.

The image output apparatus of the $12^{th}$ invention detects the size of the recording medium and gives off a warning when a recording medium which is smaller than the size of the insertion opening is detected in the vicinity of the insertion opening of the reading device.

Although it is physically impossible to insert a recording medium which is larger than the insertion opening of the reading device, a recording medium which is smaller than the insertion opening of the reading device can be inserted. In this case, an unexpected situation occurs, such as damage to the reading device and the recording medium.

In the $12^{th}$ invention, the occurrence of the foregoing unexpected situation can be prevented by giving off a warning (generating a warning sound, etc.) when a recording medium which is smaller than the insertion opening of the reading device is detected in the vicinity of the insertion opening.

Thus, the user can be guided accurately to the insertion opening of the selected recording medium.

In addition, a 13th invention is an image output apparatus having a supplementary memory device, comprising input element for inputting an image data; printout element for printing the image data; and holding element for holding the image data in the supplementary memory device.

In addition, the input element is preferably a recording medium reading element for reading and inputting image data from a recording medium or a reception element for receiving and inputting image data via a network.

In addition, the holding element preferably deletes the held image data sequentially when the image data held in the supplementary memory device exceeds a predetermined capacity.

In addition, the holding element preferably deletes the image data when an image data held in the supplementary memory device exceeds a predetermined holding period.

The "supplementary memory device" is a hard disk built into the image output apparatus.

"Print-related information" is information on whether or not image data to be printed is held, user identification information, password information, and the like.

In the 13th invention, the image output apparatus has a supplementary memory device, inputs an image data, prints the image data, and holds the image data in the supplementary memory device.

A 14th invention is an image correction method executed by an image output apparatus which prints out inputted image data. The image correction method comprises an image correction value holding of holding an image correction value for each pattern in a memory device; and an image correction of retrieving from the memory device an image correction value corresponding to the designated pattern, correcting the image data, and displaying the corrected image data.

The 14th invention is an invention related to the image correction method executed by the image output apparatus of the 6th invention.

A 15th invention is an image adjustment method executed by an image output apparatus which prints out inputted image data. The image adjustment method comprises a reference pixel designation of designating a reference pixel to be achromatic; a of calculating the difference between the color data of the reference pixel and achromatic data; and an image adjustment of performing image adjustment on the entire image data based on the difference and displaying the adjusted image data.

The 15th invention is an invention related to the image adjustment method executed by the image output apparatus of the 7th invention.

A 16th invention is an image movement method executed by an image output apparatus which prints out inputted image data. The image movement method comprises a processing of processing image data; and a movement of moving the image data to a position wherein at least a part of the image data is present within a printout area, when the entire image data goes over the printout area.

The 16th invention is an invention related to the image movement method executed by the image output apparatus of the 10th invention.

A 17th invention is an image output method executed by a computer functioning as an image output apparatus. The image output method comprises an input of inputting an image data from a recording medium by a reading device provided for each recording medium; an output of printing out the image data; a selection of selecting the recording medium type; and a switching of switching the reading device according to the selected recording medium type.

The 17th invention is an invention related to the image output method executed by the image output apparatus of the 11th invention.

An 18th invention is an input output method executed by a computer functioning as an image output apparatus. The image output method comprises an input of inputting an image data from a recording medium by a reading device provided for each recording medium; an output of printing out the image data; a detection of detecting the size of the recording medium; and a warning of giving off a warning when a recording medium which is smaller than the insertion opening is detected in the vicinity of the insertion opening of the reading device.

The 18th invention is an invention related to the image output method executed by the image output apparatus of the 12th invention.

A 19th invention is a program which causes a computer to function as any one of the image output apparatuses of the 1st invention to the 18th invention.

A 20th invention is a recording medium on which the program which causes a computer to function as any one of the image output apparatuses of the 1st invention to the 18th invention is recorded.

The foregoing program can be held in a recording medium such as a CD-ROM for distribution or can be transmitted and received via a communication line.

Effects of the Invention

According to the present invention, an image output apparatus and the like which can enhance operational flexibility by enabling switching of various settings, prevent the occurrence of unexpected situations due to false recognition and operational errors, and in addition, improve operability, facilitate smooth use and the like can be provided.

BRIEF DESCRIPTION OF THE DRAWINGS

FIG. 4 Diagram showing an example of setting data 400.

DESCRIPTION OF REFERENCE NUMERALS

Figure 1:
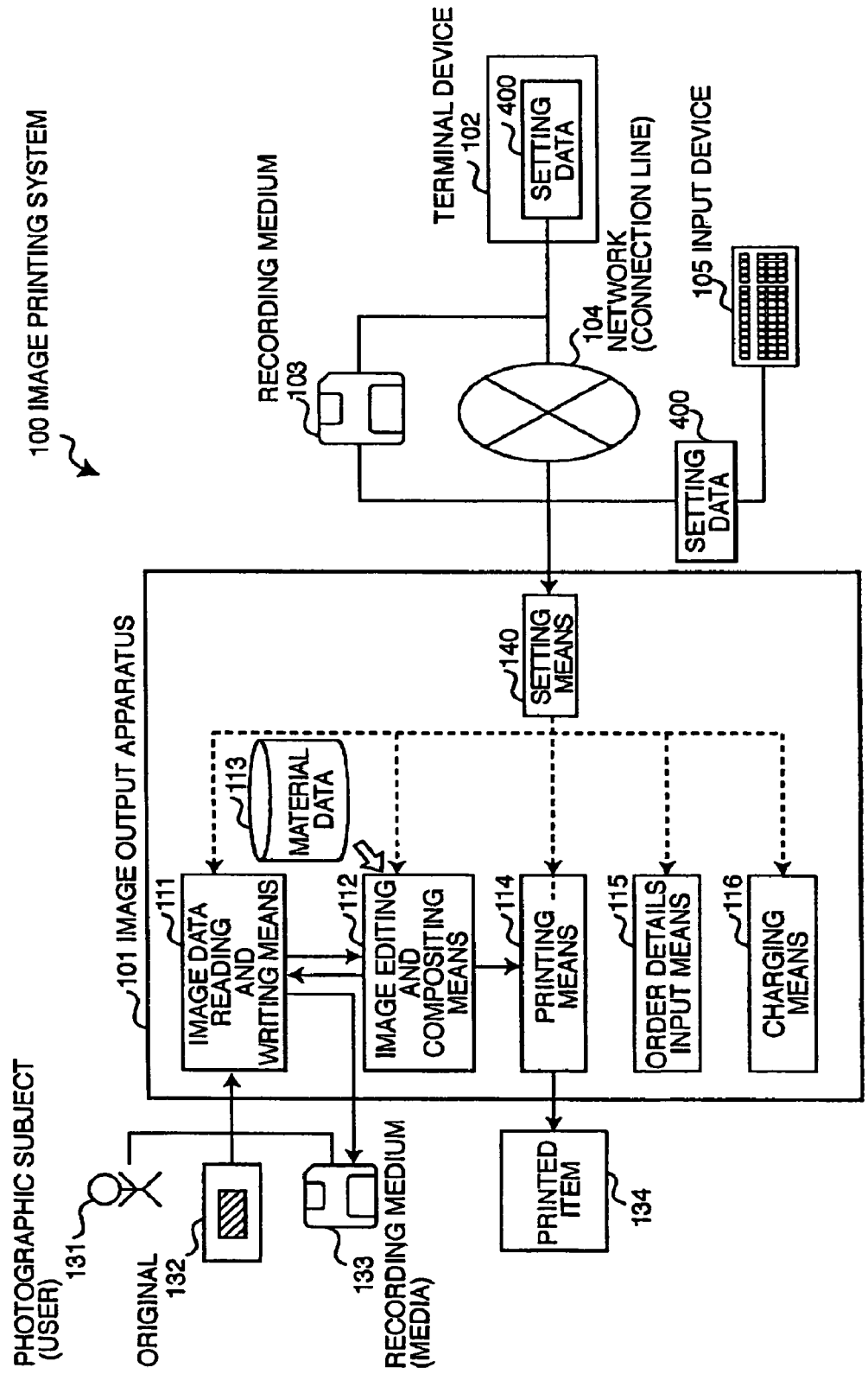
FIG. 1 Block diagram showing a configuration of an image output apparatus printing system 100 and an image output apparatus 101 according to a first embodiment of the present invention.

100: Image printing system
101 and 101-2: Image output apparatus
111: Image data reading and writing means
112: Image editing and compositing means
113: Material database
114: Printing means
115: Order details input means
116: Charging means
117: Media detection means
118: Media reader switching means
119: Media identification data base
133: Recording medium (media)
140: Setting means
200: Main unit
201: Monitor screen
202: Media reception section
207: Media detection sensor
208, 2501, 2801, 3101, 3501, and 3601: Media reader switching device
301: Control section
302: Memory section
306: Various media reading and writing section (1 to n)
307: Monitor
400: Setting data
705: EXIF information
806, 807, and 808: Batch buttons
902: Order details
1001: Simplified display screen
1002: Simplified image
1003: Selected image
1005: Image data
1006: Actual image data
1007: Reduced image data
1008: Detailed display screen
1009: Detailed image
1010: Enlarged display screen
1011: Enlarged image
1201: Scene-specific image correction screen
1202 Original image
1203 Buttons (image correction pattern (scene) designation button)
1204: Corrected image
1401: White-balance adjustment screen (pre-adjustment)
1402 and 1408: Original image
1403: Pointer
1404: Reference pixel
1406: White-balance adjustment screen (post-adjustment)
1407: Adjustment screen
1601: Image processing screen
1602: Frame
1603: Processed image
2601 and 2901: Cover plate
2602 and 2902: Hole
2603 and 2903, 3105: Insertion opening
2604, 2904, and 3102: Media reader
2605: Supporting plate
2905: Supporting roller
3103 Open and close cover
3104: Cover lock

BEST MODE FOR CARRYING OUT THE INVENTION

Preferred embodiments of an image output apparatus and the like according to the present invention will be described in detail hereinafter, with reference to the attached drawings. In the explanations and attached drawings, constituent elements having roughly the same functions and constructions are given the same reference numerals. Thus, redundant explanations are omitted.

First, the configuration of an image printing system 100 (image output apparatus 101) according to a first embodiment of the present invention is described with reference to FIG. 1.

FIG. 1 is a block diagram showing the configuration of the image printing system 100 and the image output apparatus 101 according to the first embodiment of the present invention.

The image printing system 100 comprises an image output apparatus 101, a terminal device 102, etc. Setting data 400 (described hereinafter) created in the terminal device 102 is inputted into the image output apparatus 101, via a recording medium 103, a network (connection line) 104, or the like. In addition, the setting data 400 can be inputted directly into the image output apparatus 101 by an input device 105, such as a keyboard or a mouse, provided in the image output apparatus 101.

The image output apparatus 101 comprises an image data reading and writing means 111, an image editing and compositing means 112, a material database 113, a printing means 114, an order details input means 115, a charging means 116, a setting means 140, etc.

The image data reading and writing means 111 acquires image data by photographing a subject 131 (user) with an imaging device such as a digital camera or the like, reading an original 132 with an original reading device such as a scanner device, or reading the image data from a recording medium 133 (media) to which the image data was recorded in advance. In addition, the image data reading and writing means 111 can record on the recording medium 133 image data created by the image output apparatus 101.

The recording medium 133 is, for example, Smart Media, Compact Flash® cards (CF card), Floppy® disks, PC cards, optical disks (CD-ROM, etc), and the like.

The image editing and compositing means 112 comprises an interactive-type interface for interactively compositing and editing one or more image data which has been inputted or selected. Examples of compositing and editing are processing, such as doodling and stamping, clipping of image data, size-change, pasting of clipped image onto another image, and the like. Image data used for processing, compositing and editing can be material image data, frame image data, and the like which are in a material database 113.

The printing means 114 is a high-resolution color printer. No limitation is imposed on the type of the printing system, and the printing means 14 may be of a sublimation-type or an inkjet-type. A printed item 134 is a printout of a photographed identification photograph a photograph of a digital camera image or the like, a sticker, a postcard, etc.

The user selects the details of an order for an item to be output by use of an order details input means 115. Selectable items are print mode selection (designation as to, for example, whether normal output of actual image data is performed; whether an index printout is performed; whether a postcard print is performed; whether a sticker print is performed; whether an identification photograph print is performed; etc.). Furthermore, when the normal output of actual image data and the like is selected, thumbnail images are displayed, and designation of the image to be printed when plural frames of image data are inputted (monitor display of thumbnail images and image selection in the case where digital camera images are output), specification of the number of prints and print sizes, and the like are made. Before an image is output, the user can designate one or more image data and process, composite, and edit the image data.

Various pointers such as a touch-panel which is integrated with a display means, such as a CRT or a liquid crystal panel, a keyboard, a mouse, or a trackball can be used as the order details input means 115.

The charging means 116 activates respective functions of the image output apparatus 101 according to the amount of money inserted in advance.

The setting means 140 sets the settings for the initial setting of the image output apparatus 101, operation setting, equipment setting, and the like. Settings are set based on setting data 400.

The terminal device 102 is a computer or the like which creates setting data files. The terminal device 102 creates setting data files, for example, by running an editing program such as a text editor or by running an assistance program for assisting in the creation of the setting data.

The recording medium 103 is a medium to which setting data can be recorded; for example, a Floppy® disk or a CD-ROM.

The network (connection line) 104 is a network, a connection line, or the like. The network can be a LAN (Local Area Network), a dedicated line, the internet, etc. The connection line can be a cable, a bus, etc. The network 104 may be wired or wireless. The network (connection line) 104 mediates the transfer of data between the terminal device 102 and the image output apparatus 101.

In addition, the input device 105 is an input device such as a keyboard or a mouse and directly inputs setting data 400 in the image output apparatus 101.

Next, the outer structure of the image output apparatus 101 is described with reference to FIG. 2.

Figure 2:
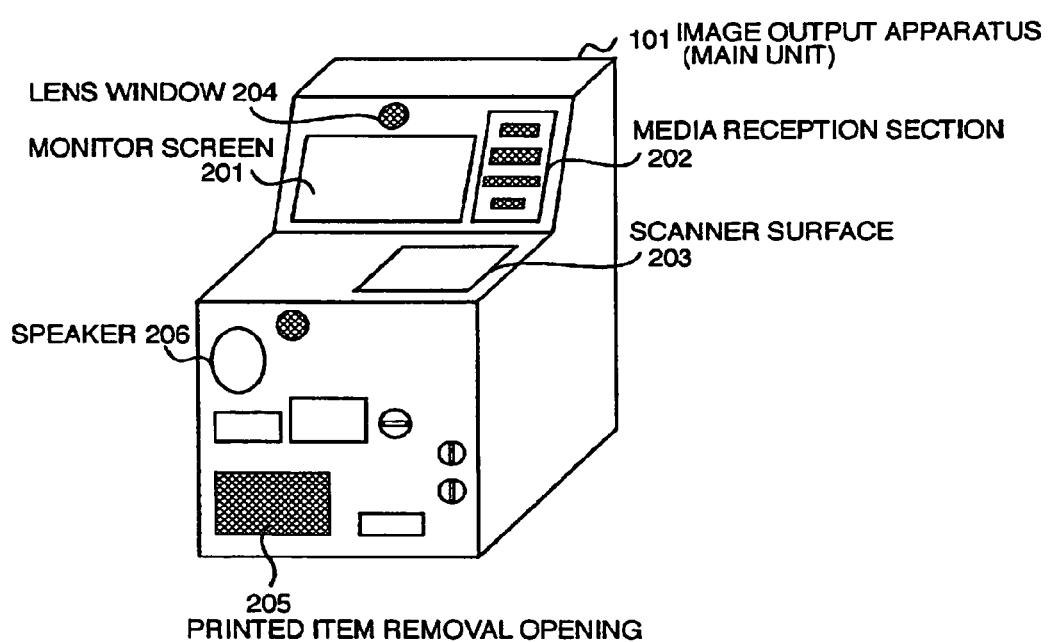
FIG. 2 Outer perspective view of the image output apparatus 101.

FIG. 2 is an outer perspective view of the image output apparatus 101.

A monitor screen 201, which is a monitor with a touch-panel or the like, is placed on the front surface of the upper part of the image output apparatus 101 (main unit). The monitor screen 201 functions as a display means for displaying an operation guide, the operation state, a read image, an edited and processed image, and the like.

A media reception section 202 is placed beside the screen of the monitor screen 201. A scanner surface 203 for reading and digitalizing an image of a printed item is placed in a horizontal part which separates the upper part and the lower part of the image output apparatus 101. In addition, a lens window 204 for photographing a subject (user, etc.) with a digital camera or the like is placed above the screen of the monitor screen 201.

These media reception section 202, scanner surface 203, and window 204 constitute a part of the image data reading and writing means 111.

The media reception section 202 is a reception section for various media (such as Smart Media, CompactFlash® cards (CF cards), Floppy® disks, PC cards, and optical disks (CD-ROM, etc.)). A Floppy® disk insertion opening, a CD-ROM insertion opening, a PC card insertion opening, a Smart Media insertion opening, a CompactFlash® insertion opening, and the like are placed collectively in one location. In addition, the respective main units (not shown) of the reading devices (media readers) corresponding to each of the above-mentioned recording media types are placed within the main unit of the image output apparatus 101.

In addition, each insertion opening can comprise an open and close cover (shutter). In this case, the image output apparatus 101 can be set so that the recording medium cannot be removed during processing or the recording medium cannot be removed until the charging processing or the collection of fees is completed, by controlling the opening and closing of the open and close flap.

A printed item removal opening 250, a speaker 206, and the like are installed in the lower part of the image output apparatus 101. In addition, a fee insertion opening (coin insertion opening and bill insertion opening), a return lever, a return opening, a receipt removal opening, a maintenance key, a door open and close key, and the like are also provided herein.

The printed item removal opening 250 constitutes a part of the printing means 114. The user receives the printed item ejected from the printed item removal opening 205 after instructing the execution of printing, such as by touching a touch-panel button.

The speaker 206 reproduces a warning sound, an acknowledgment sound, an operation guide message, voice, BGM, sound effects, and the like during operation or during standby.

In addition, a personal computer including a control section for controlling each constituent part, a power supply box for performing voltage conversion, an uninterruptible power source device for preventing damage to the CPU, hard disk, etc. of the control section during a power outage, and the like (not shown) are installed within the main unit of the image output apparatus 101.

Next, the hardware configuration of the image output apparatus 101 is explained with reference to FIG. 3.

Figure 3:
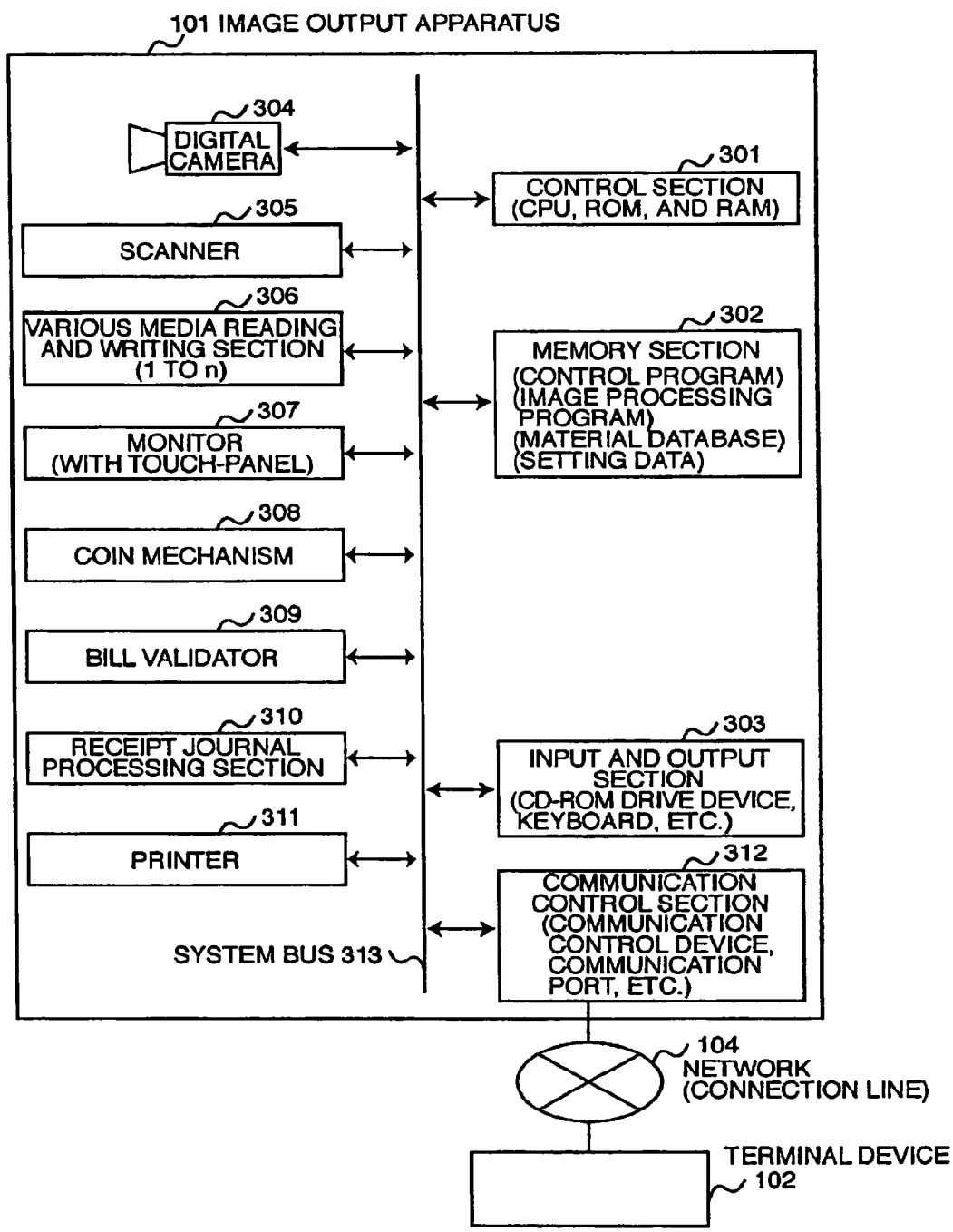
FIG. 3 Hardware configuration diagram of the image output apparatus 101.

FIG. 3 is a hardware configuration diagram of the image output apparatus 101.

In the image output apparatus 101, a control section 301, a memory section 302, an input and output section 303, a digital camera 304, a scanner 305, various media reading and writing sections 306 (1 to n), a monitor 307 (with a touch-panel), a coin mechanism 308, a bill validator 309, a receipt journal processing section 310, a printer 311, a communication control section 312, and the like are connected via a system bus 313.

The control section 301 comprises a CPU, ROM, RAM, and the like. The control section 301 drive-controls each device connected thereto via the system bus 313, according to a program stored in the memory section 302, which is a hard disk or the like serving as a large-capacity memory medium.

Programs for drive-controlling each constituent part, for example, a reading and writing program corresponding to each recording medium, a charging program, and the like, are stored in the memory section 302. In addition, an image processing program for editing and processing an inputted or selected image as a part of the input editing and compositing means 112 and a program for displaying an interactive-type menu on the monitor 307 as a part of the order details input means 115, setting printing conditions for the printing means 114, and instructing the start of printing are stored in the memory section 302. Furthermore, a material database 113 to which image data, such as frames used for image composition, background images, line illustration images for coloring, etc. are stored, various setting data, and the like are also stored in the memory section 302.

The program codes are read from the control section 301 as required, transferred to the RAM, and read by the CPU so as to be executed as various means.

In addition, the memory of the control section 301 or the memory section 302 can temporarily hold information such as data necessary for processing, image data, and the like.

The input and output section 303 (CD-ROM drive device, keyboard, mouse, etc.) are used to update programs and information stored in the ROM of the control section 301 and the memory section 302, as well as at the time of settings, such as the operation settings of the image printing system and equipment settings. The settings are set by switching the main unit section to a management mode with the maintenance key, inserting a CD-ROM for updates into the input and output section 303, and overwriting data. Alternatively, the settings are set by entering setting data.

The digital camera 304, the scanner 305, and the various media reading and writing sections 306 (1 to n) perform data acquisition and input. These sections correspond to the image data reading and writing means 111.

A sequence of operations, from print mode selection and reading of original image data, processing, compositing, and editing to the output of a printed item can be performed by the user through selecting and touching the touch-panel buttons displayed on the monitor 307 according to the operation guide displayed on this monitor 307. The monitor 307 corresponds to the abovementioned display means.

The coin mechanism 308, the bill validator 309, and the receipt journal processing section 310, equivalent to the charging means 116, receive coin insertion and bill insertion and issues receipts.

The printer 311, equivalent to the printing means 114, performs the image printout process.

The communication control section 312 is a communication control device, a communication port, or the like, which performs communication control between the image output apparatus 101 and the terminal device 102.

The system bus 313 is a path which mediates the transfer of control signals, data signals, etc. between the sections and the devices.

Next, setting data is described with reference to FIG. 4.

FIG. 4 is a diagram showing an example of the setting data 400.

The setting data 400 indicates information regarding operation settings for processes (device control, image processing, printing output processing, etc.) executed by the image output apparatus 101, equipment settings, and the like.

The setting data 400 records information in text format or the like. When the setting data 400 is inputted, the image output apparatus 101 sets initial settings based on the setting data, holds the setting data in a hard disk device or the like, and references the setting data as setting values, parameters, etc. when executing various processes.

The setting data 400 shown in FIG. 4 has respective fields, such as setting item 401, setting details 402 (setting variables, setting values, etc.), and the like.

The setting item 401 indicates setting items, such as initial settings, operation settings, equipment settings, and the like. The setting details 402 indicate setting details regarding the setting items and holds setting variables, setting values, etc.

The setting item 401 is, for example, item 411 "Use of EXIF information", item 412 "Subjects of operational instruction by the batch button", item 413 "Tax rate", item 414 "Taxation method", item 415 "Tax amount display", item 416 "Temporary display of EXIF reduced image data", item 417 "Monitor resolution", item 418 "Image correction pattern", and the like.

The item 411 "Use of EXIF information" indicates whether or not EXIF information (date information, etc.) held by the image data is used. For example, "Use", "Do not use", or the like is held as setting details.

The item 412 "Subjects of operational instruction by the batch button" indicates whether to apply an instruction to increase/decrease/reset the number of prints only to the image data on the display screen or to apply the instruction to increase/decrease/reset the number of prints to not only the image data on the display screen, but all image data within the recording media as well, when the instruction to increase/decrease/reset the amount of prints is given through the batch button. For example, "Displayed image only", "All", or the like is held as setting details.

The batch buttons are "All +" (increase number of prints), "All −" (decrease number of prints), "All 0" (reset number of prints) buttons, and the like.

The item 413 "Tax rate" indicates the tax rate for sales tax. For example, "5%" or the like is held as setting details.

The item 414 "Taxation method" indicates the taxation method for tax. For example, "Tax-inclusive", "Tax-exclusive", or the like are held as setting details.

The item 415 "Tax amount display" indicates whether or not to perform screen display of the tax amount. For example, "Display on screen", "Do not display on screen", or the like is held as setting details.

The item 416 "Temporary display of EXIF reduced image data" indicates whether or not to enlarge and temporarily display simplified image data (EXIF reduced image data) when transitioning from a simplified image display (reduced image data) to a detailed image display (actual image data and high-quality image), because of long processing time. For example, "Display temporarily", "Do not display temporarily", or the like is held as setting details.

The item 417 "Monitor resolution" indicates the resolution of the monitor screen. For example, "1280×1024 (5:4)", "1024×768 (4:3)", or the like is held as setting details.

The item 418 "Image correction pattern" indicates the image correction attributes and the like for each image correction pattern. Brightness value, contrast, gamma value, yellow value, magenta value, cyan value, and the like are held as setting details for each image correction pattern.

The image correction patterns are, for example, patterns of shots, scenes, situations, etc., such as "Sunset", "Night view", "Portrait", "Indoors", and the like.

With regards to setting details 402, default values which indicate standard values can be provided as setting values.

In addition, all or a portion of the setting data can be recorded in a separate data (separate file) or the like, and the reference destination of this data (file) and the like can be written in the setting data 400.

Next, an operation of the image printing system 100 is described with reference to FIG. 5 and FIG. 6.

Figure 5:
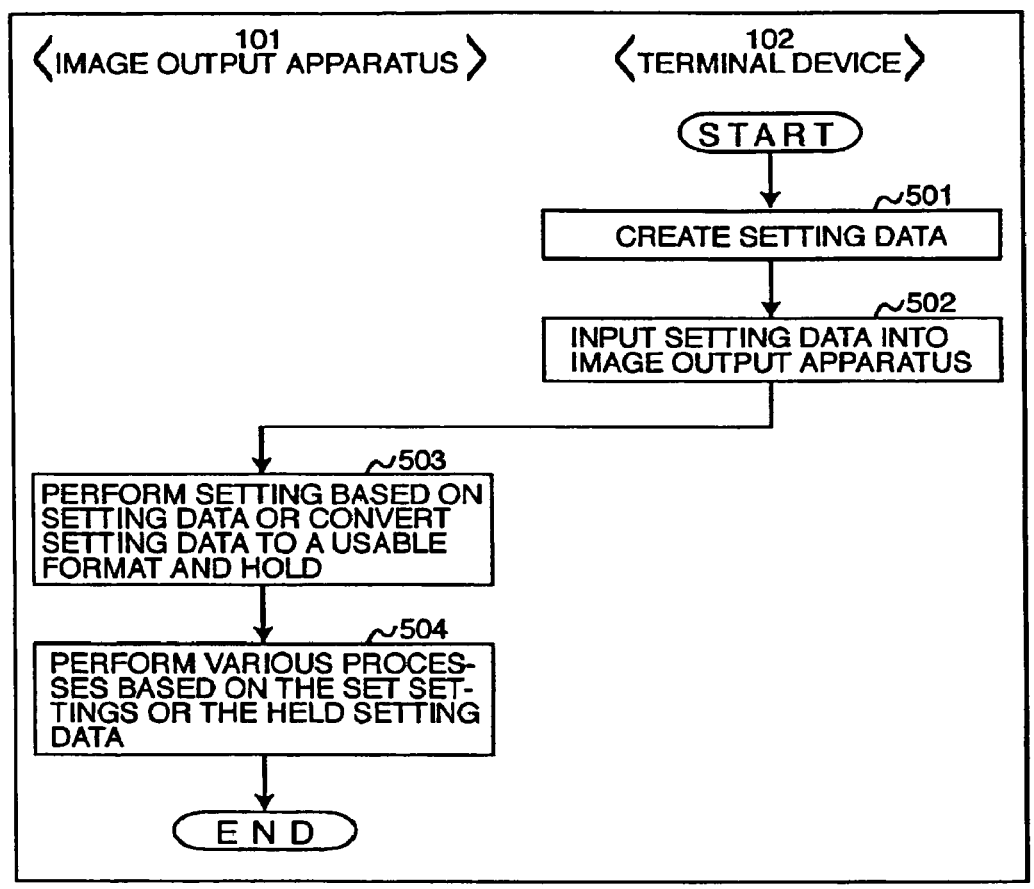
FIG. 5 Flowchart showing an operation of the image output apparatus 101 and a terminal device 102 related to a setting process.

FIG. 5 is a flowchart showing the operations of the image output apparatus 101 and the terminal device 102 related to a setting process.

The terminal device 102 creates setting data (Step 501) and inputs and provides this setting data to the image output apparatus 101 (Step S502).

The image output device 101 sets the settings based on the setting data or converts the setting data into a format which can be used and referenced when executing various processes and holds the setting data in the hard disk device or the like (Step 503). The image output apparatus 101 performs various processes based on the set operation settings, equipment settings, or held setting data (Step 504).

Figure 6:
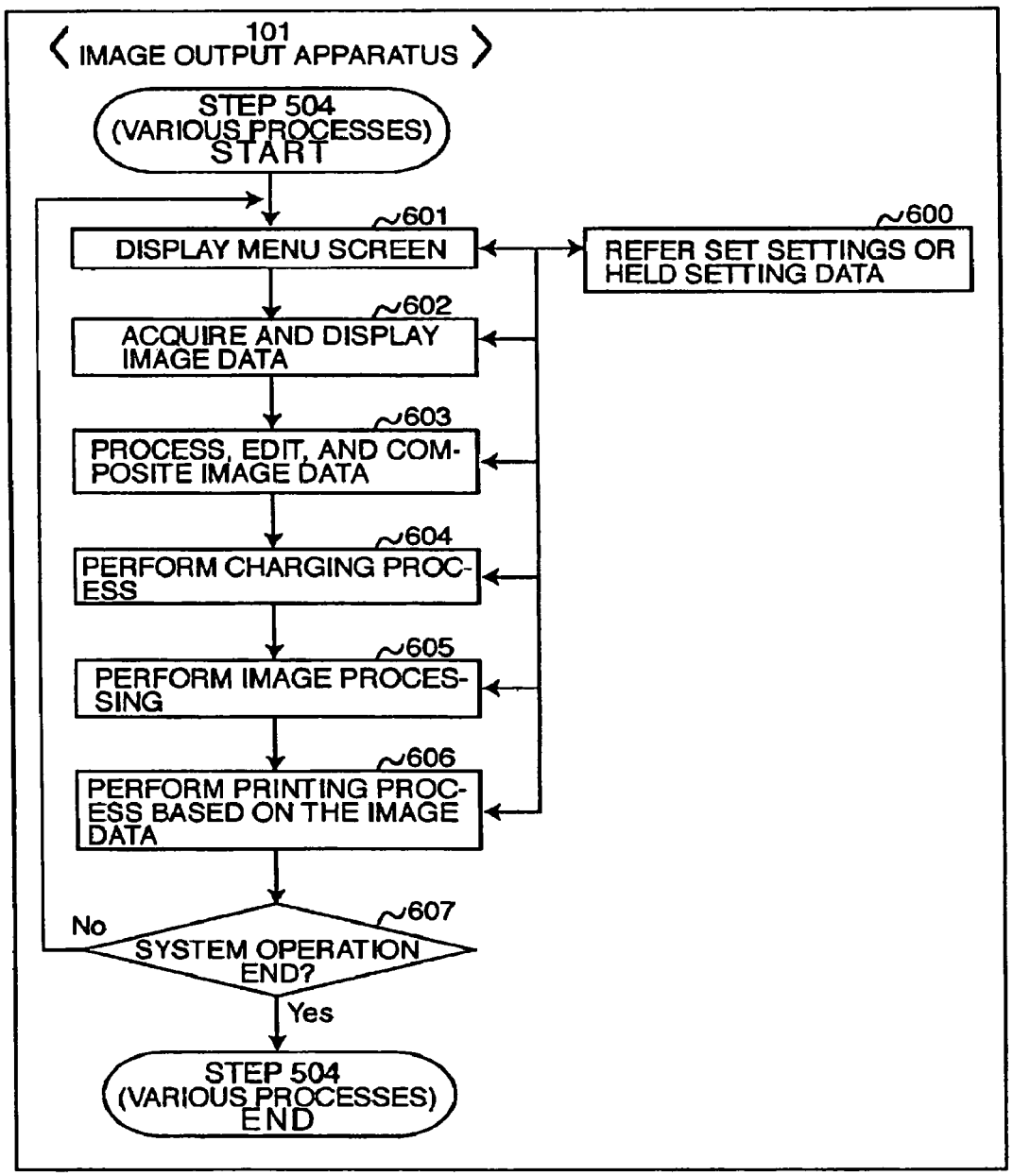
FIG. 6 Flowchart showing an operation of the image output apparatus 101.

FIG. 6 is a flowchart showing an operation of the image output apparatus 101 related to the foregoing Step 504 (various processes).

The image output apparatus 101 (control section 301) displays a menu screen showing service details, procedures, guides, etc. and requests that the user make selections (Step 601).

The image output apparatus 101 acquires image data and displays the image data on the monitor (Step 602). When inputting image data, the user can select a method, such as reading from a recording media, reading from a scanner, or photographing a subject by an imaging device (digital camera and the like).

The image output apparatus 101 performs processing, editing, compositing, etc. of the image data based on instructions from the user (Step 603). Processing, editing, and compositing of the image are, for example, compositing input image data together, compositing with a frame image, compositing with existing images and the like, coloring, inputting text, moving, enlarging and reducing, creating postcard data, and the like.

The image output apparatus 101 performs a charging process and a receipt issuing process in accordance with the details of the user's order (output mode (photograph print, sticker print, index print, postcard print, etc.), the number of prints, etc.).

The image output apparatus 101 performs image processing, such as color correction, resizing, trimming, layout, composition of text and logos, and the like (Step 605). Then, the image output apparatus 101 holds the image-processed image data in the memory, hard disk device, or the like, transfers the image data to a printer device which is in an output-ready state, and performs the printout process (Step 606).

When continuing the operation of the image printing system 100 (No in Step 607), the image output apparatus 101 repeats the processes in Step 601 to Step 607.

When performing the processes in Step 601 to 607 and the like, the image output apparatus 101 performs the processes with reference to the set settings or the held setting data (Step 503; FIG. 5) (Step 600).

Through the process above, the image output apparatus 101 sets the initial settings, operation settings, equipment settings, etc. based on the inputted setting data or converts the setting data into a format which can be used and holds the converted setting data. Then, the image output apparatus 101 performs various processes with reference to these settings.

In this way, information related to settings, such as initial settings, operation settings, and equipment settings are collectively stated in a single text file or the like to thereby create the setting data. The thus-created setting data are input to the image output apparatus 101. Settings can be set in a batch using a unified format, procedure, and method, even when there is a wide range of setting subjects. Therefore, the burden of effort related to the configuration of initial settings, operation settings, equipment settings, etc. can be reduced significantly.

The setting data created by the terminal device 102 can be inputted into the image output apparatus 101 via a recording medium or via a connection line, such as a network or a cable. In addition, in place of creating the setting data in the terminal device 102, setting data can be directly entered into an input device, such as a keyboard, mouse, etc., provided in the image output apparatus 101.

Although it is stated herein that the setting data 400 is recorded in a text file format or the like, the present invention is not limited thereto. The type and format of the setting data is irrelevant as long as the setting data 400 can be acknowledged by the image output apparatus 101. In addition, the setting data 400 can be created not only simply by text input, but also by the use of a program for assisting in the creation of the setting data 400, through an interface provided by this program. This assistance program can be installed in either the image output apparatus 101 or the terminal device 102.

In addition, it was described in FIG. 6 that the image output apparatus performs processes with reference to set settings or held setting data. However, when settings are set based on setting data (Step 503; FIG. 5), the settings can be directly embedded within the process program specifying the operations of the image output apparatus. In this case, the image output apparatus 101 can automatically perform processes based on the embedded settings when this process program is executed.

Next, an operation of the image output apparatus 101 for the setting item 411 "Use of EXIF information" is described with reference to FIG. 7.

Figure 7:
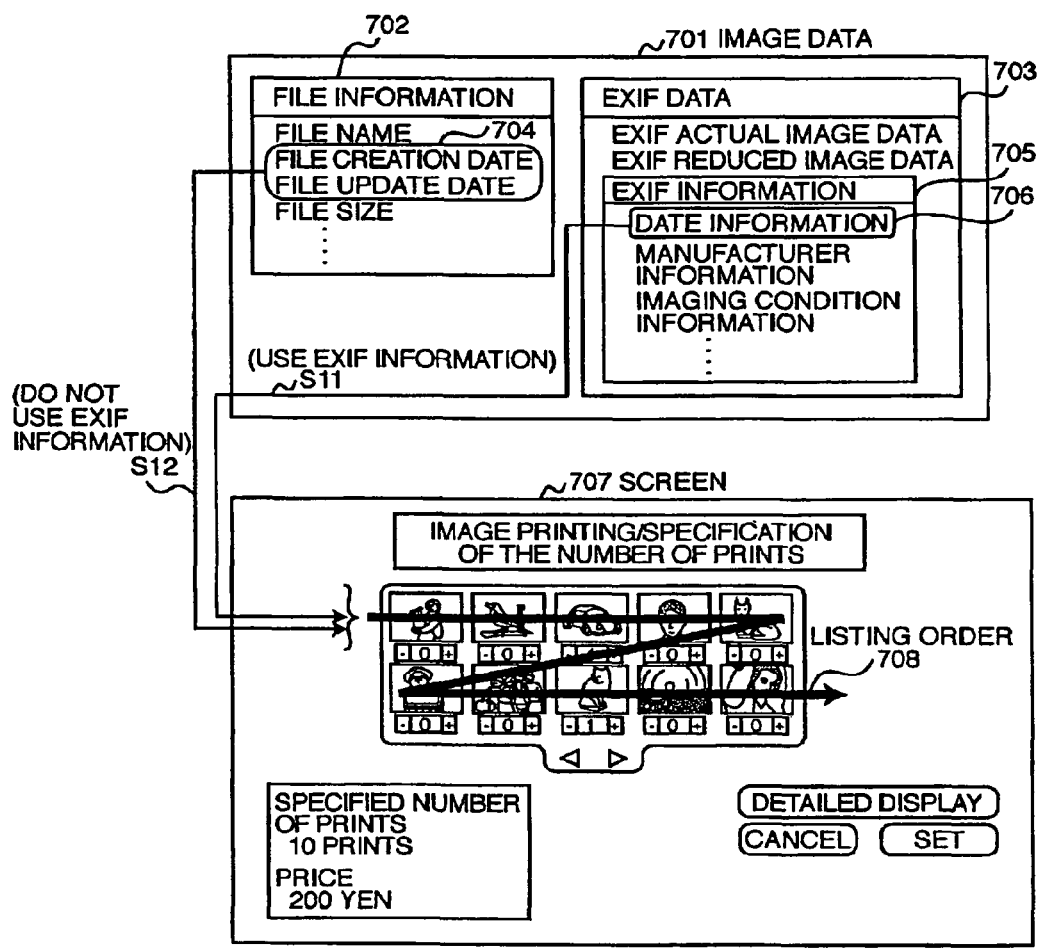
FIG. 7 Diagram showing the flow of a process performed by the image output apparatus 101 in relation to setting item 411 "EXIF information usage".

FIG. 7 is a diagram showing the flow of a process of the image output apparatus 101 related to the setting item 411 "Use of EXIF information".

Image data 701 is an image data file in EXIF (Exchangeable Image File Format) image format. The image data 701 comprises file information 702 which can be recognized by the OS (Operation System), EXIF data 703 which is recognized by a predetermined application, and the like, respectively.

The file information 702 holds the file name, file creation date, file update date, file size, and the like.

The EXIF data 703 holds EXIF actual image data, EXIF reduced image data (EXIF thumbnail image), EXIF information 705, and the like.

The EXIF information 705 holds date information, manufacturer information, imaging or photographing condition information (shutter speed, aperture, whether or not strobe is lighted, etc.)

The image output apparatus 101 determines the listing order 708 [chronological order (from the oldest or from the newest)] of the image data with reference to the date information 706 in the EXIF information 705 and displays the list on the screen 707 (S11), when EXIF information is used based on settings (set settings, reference to setting data, etc.).

The image output apparatus 101 determines the sorting order [chronological order (from the oldest or from the newest)] of the image data with reference to the file creation date or the file update date 704 of the file information 702 and displays the list on the screen 707 (S12), when EXIF information is not used based on settings (set settings, reference to setting data, etc.).

The image output apparatus 101 not only reads the date information, but also other information at the same time, when using the EXIF information. Therefore, information related to the image data can be acquired in detail.

Meanwhile, when the EXIF information is not used, only the file creation date or the file updated date can be read. Therefore, a list of image data in the date order can be displayed quickly.

In this way, the image output apparatus 101 can configure the setting for the use/disuse of EXIF information according to the system environment and the wishes of the manager, installer, operator, user, and the like. Thus, the operational flexibility of the image output apparatus 101 can be enhanced and the operability thereof can be improved, as well.

Next, an operation of the image output apparatus 101 related to the setting item 412 "Subjects of operational instruction by the batch button" is described with reference to FIG. 8.

Figure 8:
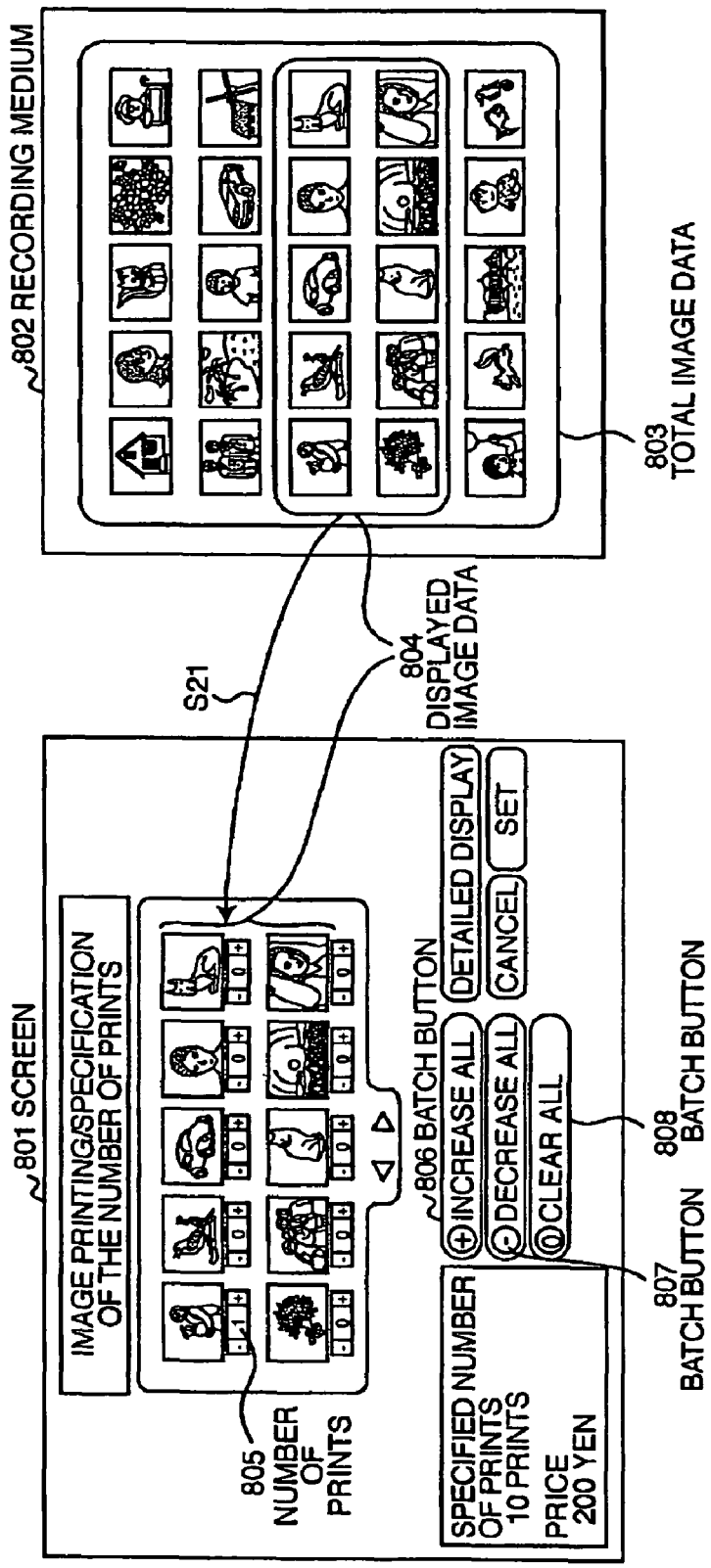
FIG. 8 Diagram showing the flow of a process performed by the image output apparatus 101 in relation to setting item 412 "Subjects of operational instruction by the batch button".

FIG. 8 is a diagram showing the flow of a process performed by the image output apparatus 101 in relation to setting item 412 "Subjects of operational instruction by the batch button".

The image output apparatus 101 retrieves a display image data 804 which is to be displayed on the screen from the all image data 803 held in a recording medium 802 and displays this display image data 804 on a screen 801 (S21).

The user can perform printout by specifying the number of prints 805 for each individual image displayed on the list screen 801.

When the subjects of operational instruction by the batch button 806 ("All + (increase all)"), batch button 807 ("All − (decrease all)"), and batch button 808 ("All 0 (clear all") are only the displayed image data, the image output apparatus 101 reflects the specification of the number of prints made by batch button 806 to batch button 808 on only the display image data 804, based on the settings (set settings and reference to setting data).

When the subjects of operational instruction by the batch button 806 ("All + (increase all)"), batch button 807 ("All − (decrease all)"), and batch button 808 ("All 0 (clear all") are all the image data, the image output apparatus 101 reflects the specification of the number of prints made by batch button 806 to batch button 808 on not only the display image data 804, but also on all the image data 803, based on the settings (set settings and reference to setting data).

When the image output apparatus 101 reflects the specification of the number of prints made by batch button 806 to batch button 808 on only the display image data 804, false recognition by the user can be prevented because the changes to the number of prints can be verified on the screen.

Meanwhile, when the image output apparatus 101 reflects the specification of the number of prints made by batch button 806 to batch button 808 on all the image data 803, it is not necessary to display all images on the screen because the number of prints are specified for all the images. Therefore, a quick user operation can be actualized.

In this way, the image output apparatus 101 can configure the settings for the subjects of operational instruction for a batch button based on the system environment, the wishes of the manager, installer, operator, user, and the like. Thus, the operational flexibility of the image output apparatus 101 can be enhanced and the operability thereof can be improved, as well.

Next, an operation of the image output apparatus 101 related to setting item 413 "Tax rate", setting item 414 "Taxation method", and setting item 415 "Tax amount display" is described with reference to FIG. 9.

Figure 9:
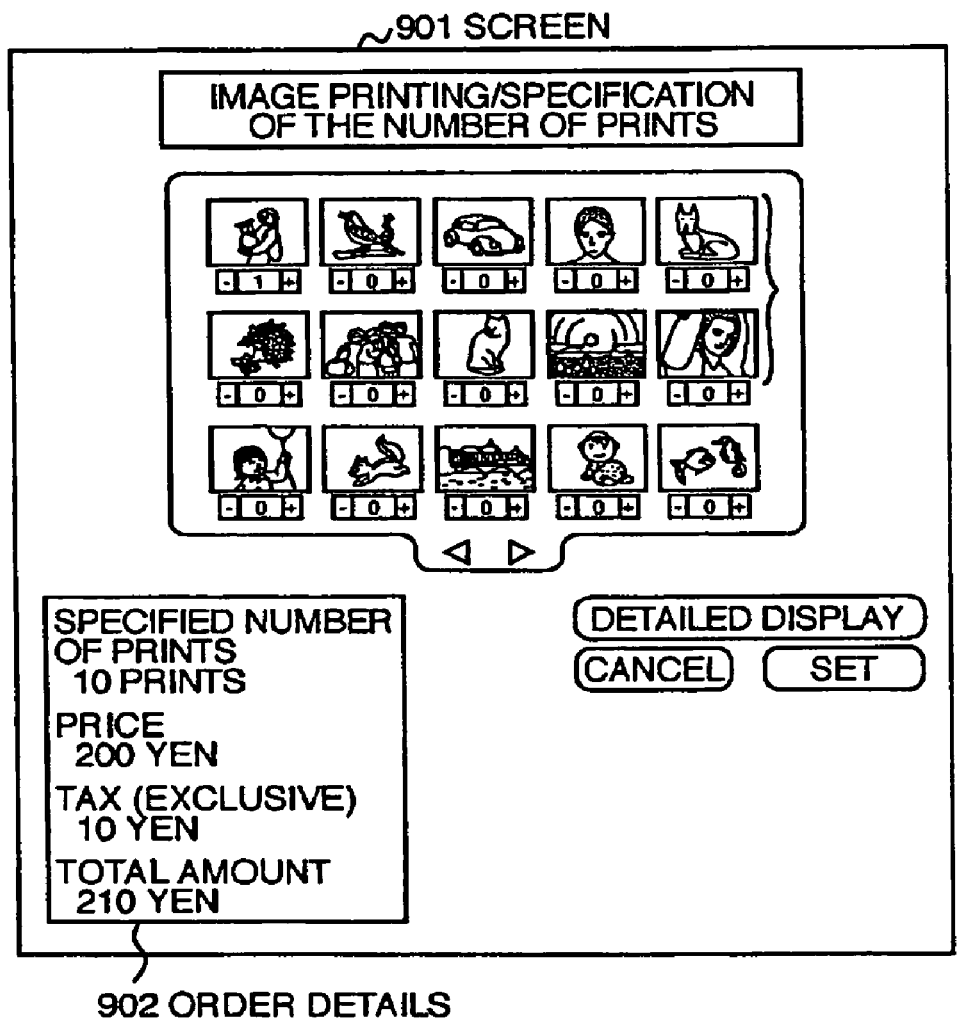
FIG. 9 Diagram showing the flow of an image output apparatus 101 process for setting item 413 "Tax rate", setting item 414 "Taxation method", and setting item 415 "Tax amount display".

FIG. 9 is a diagram showing the flow of a process performed by the image output apparatus 101 in relation to setting item 413 "Tax rate", setting item 414 "Taxation method", and setting item 415 "Tax amount display".

The image output apparatus 101 displays a user's order details 902 on the screen 901 (image printing and print number specification screen) based on the settings (set settings, reference to setting data, etc.).

The display of the order details 902 in FIG. 9 is that of when the setting item 413 "Tax rate" is "5%", the setting item 414 "Taxation method" is "Tax-exclusive", and setting item 415 "Tax amount display" is "Display on screen". The user can verify the tax amount, the taxation method, the tax rate, etc., by this order details 902 display.

In this way, the image output apparatus 101 can configure the settings for tax display, tax calculations, etc. based on the system environment, the wishes of the manager, installer, operator, user, and the like. Thus, the operational flexibility of the image output apparatus 101 can be enhanced and the operability thereof can be improved, as well.

Next, an operation of the image output apparatus 101 related to setting item 416 "Temporary display of EXIF reduced image data" is described with reference to FIG. 10.

Figure 10:
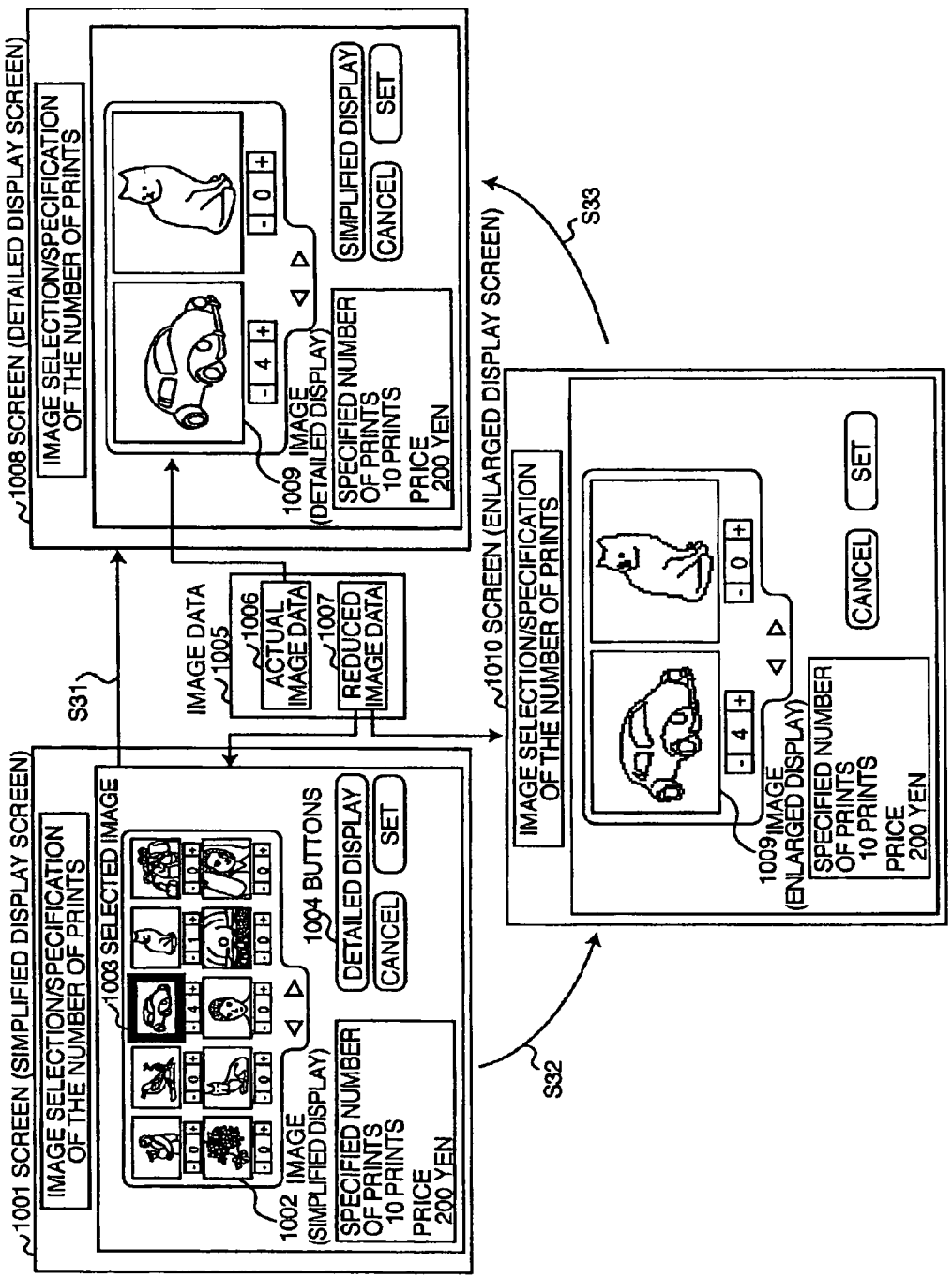
FIG. 10 Diagram showing the flow of a process performed by the image output apparatus 101 in relation to setting item 416 "Temporary display of EXIF reduced image data".

FIG. 10 is a diagram showing the flow of a process performed by the image output apparatus 101 in relation to setting item 416 "Temporary display of EXIF reduced image data".

The image output apparatus 101 displays the simplified image 1002 (image list) on the screen 1001 of the monitor. The EXIF reduced image data 1007 (EXIF thumbnail data, etc.) of the image data 1005 and the like can be used for simplified image display.

When the user selects selected image 1003 and touches the button 1004 "detailed display" on the monitor, the image output apparatus 101 displays the detailed image 1009 on the screen 1008 on the monitor.

The detailed image display is performed by reducing the actual image data 1006 (EXIF actual data or original image) of the image data 1005 and the like as required. Processing time is required for this detailed image display, and therefore, a certain amount of time is required to switch from the simplified display screen 1001 to the detailed display screen 1008.

When the temporary display of EXIF reduced image data is not performed based on the settings (set settings, reference to setting data, etc.), the image output apparatus 101 continues to display the simplified image 1002 on the screen 1001 on the monitor during the switch from the abovementioned screen 1001 to the screen 1008. Subsequently, when the creation of a detailed image 1009 from the actual image data 1006 is completed after a reduction process, etc., this detailed image 1009 is displayed on the screen 1008 of the monitor (S31). In other words, the image output apparatus 101 switches directly from the simplified display screen 1001 to the detailed display screen 1008 of the monitor.

When performing temporary display of EXIF reduction image data based on the settings (set settings, reference to setting data, etc.), the image output apparatus 101 shows an enlarged image 1011, which is the reduced image data enlarged to the size of the detailed image, on the screen 1010 on the monitor (S32) during the switch from the abovementioned screen 1001 to the screen 1008. Subsequently, when the creation of the detailed image 1009 from the actual image data 1006 is completed after a reduction process, etc., this detailed image 1009 is displayed on the screen 1008 of the monitor (S33). In other words, the image output apparatus 101 switches from the simplified display screen 1001 to the detailed display screen 1008 via an enlarged display screen 1010.

The enlarged image 1011 is the reduced image data 1007 displayed at an enlarged size. Thus, in comparison to the detailed image 1009, the image quality is relatively poor.

When not performing temporary display of EXIF reduced data, the image output apparatus 101 does no display a low quality, rough image during the switch from the simplified display screen 1001 to the detailed display screen 1008. Therefore, the user can be prevented from experiencing discomfort towards low-quality image display.

On the other hand, when performing temporary display of EXIF reduced image data, the image output apparatus 101 displays the enlarged display screen 1010, which is the simplified image with an enlarged size although its quality is poor. Therefore, the user can be aware of the processing situation.

In this way, the image output apparatus 101 can configure the setting for whether or not to perform temporary display of EXIF reduced image data based on the system environment, the wishes of the manager, installer, operator, user, and the like. Thus, the operational flexibility of the image output apparatus 101 can be enhanced and the operability thereof can be improved, as well.

Next, an operation of the image output apparatus related to setting item 417 "Monitor resolution" is described.

The image output apparatus 101 sets the monitor resolution based on the settings (set settings, reference to setting data, etc.). The monitor resolution is, for example, resolution "1280×1024 (5:4)" or resolution "1024×768 (4:3)".

Because the height and width ratio of resolution "1280×1024 (5:4)" and resolution "1024×768 (4:3)" differ, the images and text on the screen become distorted when only the monitor resolution of the personal computer is changed. Thus, distortion and changes in the size of images and text can be prevented by providing a monitor resolution setting function in the system.

In this way, the image output apparatus 101 can configure the setting of the monitor resolution based on the system environment, the wishes of the manager, installer, operator, user, and the like. Thus, the operational flexibility of the image output apparatus 101 can be enhanced and the operability thereof can be improved, as well.

Next, an operation of the image output apparatus 101 related to setting item 418 "Image correction pattern" is described with reference to FIG. 11 and FIG. 12.

Figure 11:
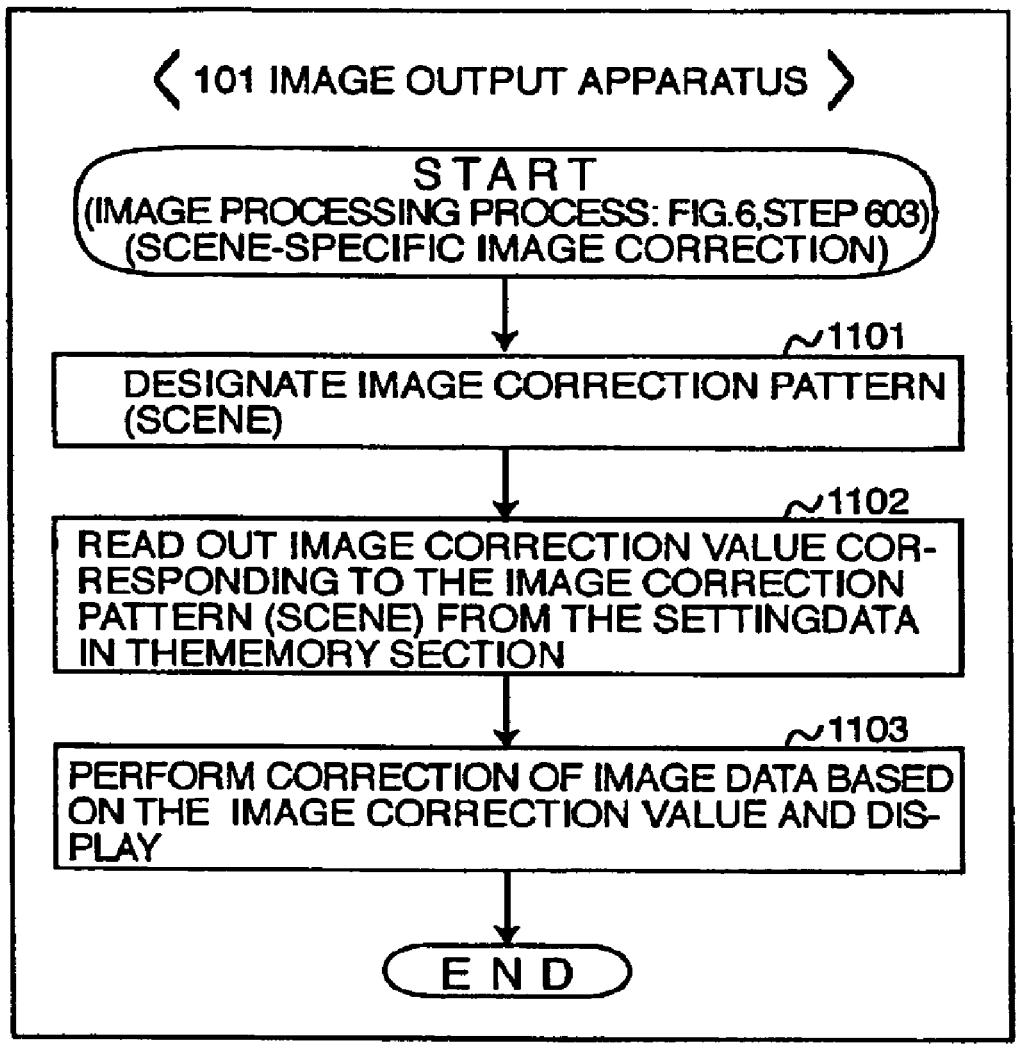
FIG. 11 Flowchart showing the flow of a process performed by the image output apparatus 101 in relation to setting item 418 "Image correction pattern".

FIG. 11 is a diagram showing the flowchart of an operation of the image output apparatus 101 related to setting item 418 "Image correction pattern".

Figure 12:
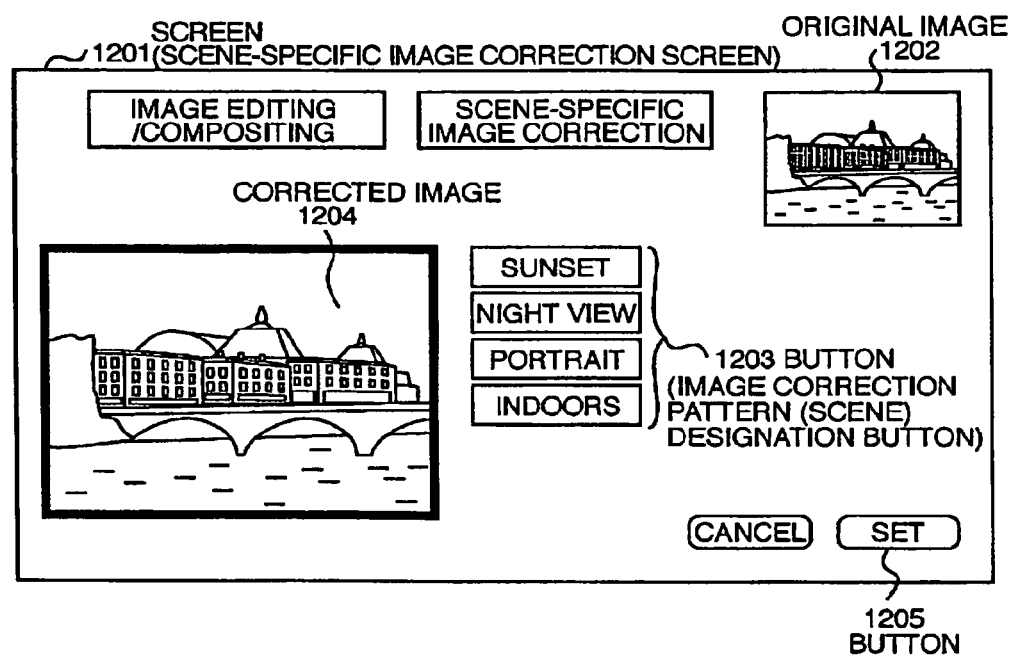
FIG. 12 Diagram showing an example of a scene-specific image correction screen 901 displayed by the image output apparatus 101.

FIG. 12 is a diagram showing an example of a scene-specific image correction screen 1201 shown by the image output apparatus 101.

In the image processing process (FIG. 6: Step 603), the image output apparatus 101 (control section 301) displays a scene-specific image correction screen 1201. On the scene-specific image correction screen 1201, an original image 1202, a button 1203 for designating an image correction pattern (scene), a corrected image 1204, and the like are displayed.

When the user designates an image correction pattern (scene) by touching the button 1203 on the monitor (Step 1101), the image output apparatus 101 retrieves the image correction values corresponding to the designated image correction pattern (scene) from the setting data in the memory section 302 (Step 1102). Then, the image output apparatus 101 creates corrected image data by performing image correction on the original image data based on the image correction values, and displays the corrected image 1204 on the screen 1201 of the monitor (Step 1103). The user checks the corrected image 1204 and completes the scene-specific image correction by touching the button 1205 "Set" on the monitor.

The image output apparatus 101 performs image correction on the original image according to the image correction pattern (scene) designated by the user, through the process above.

For example, when the user selects "Sunset" as the image correction pattern (scene), the image output apparatus 101 performs an image correction to give the original image an overall redness and creates the corrected image. In addition, image quality conversions to sepia, monochrome, etc. can be performed.

Image correction values suitable for respective scenes, such as a sunset scene, indoors, such as party, night scene, portrait-style, and the like, are set in advance and a specification button for each scene is provided. Thus, the user can perform operations related to image quality adjustments easily. The image output apparatus 101 can perform image correction on image data taken by a digital camera on automatic setting or the like. Therefore, the image can be sharpened further.

In this way, the image output apparatus 101 holds the image correction value settings for each image correction pattern in advance and performs image correction based on the image correction values set and held in advance when the image correction pattern is designated. Thus, the operational load related to image correction placed on the user can be reduced.

Next, a white-balance adjustment process is described with reference to FIG. 13 and FIG. 14.

Figure 13:
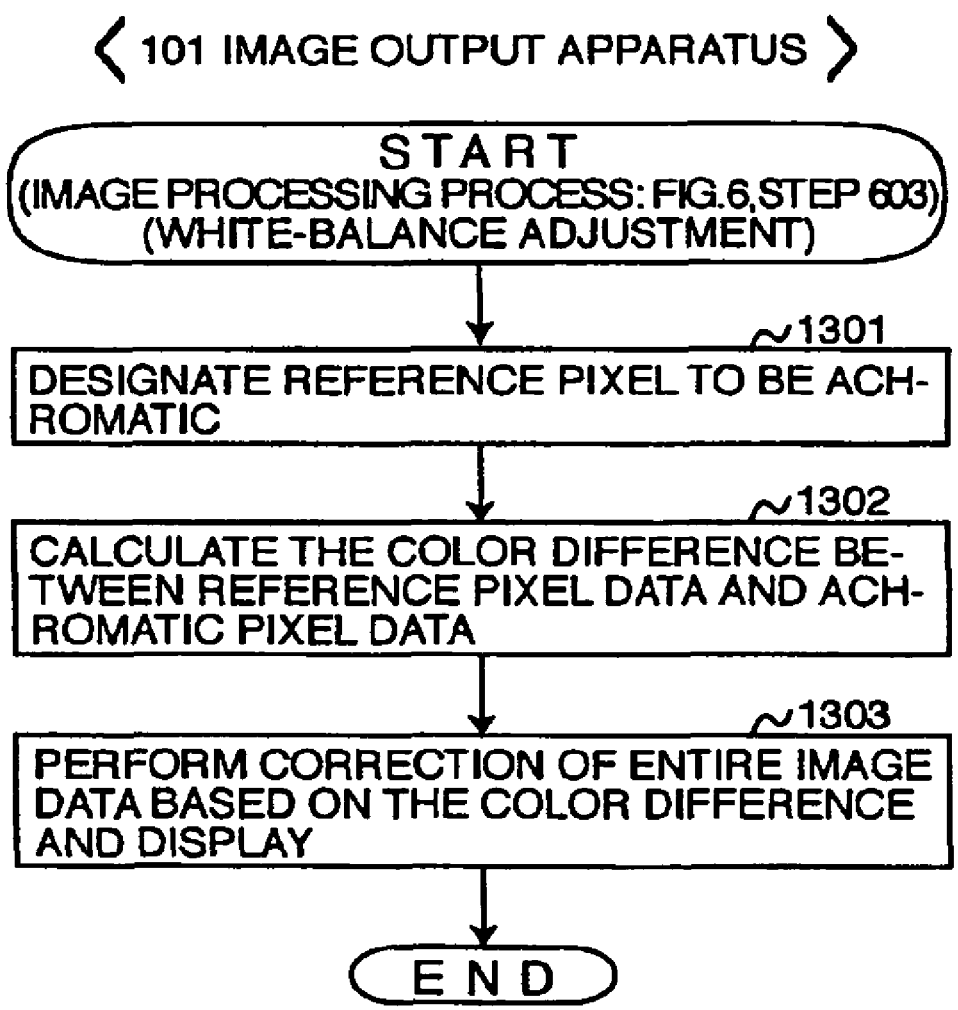
FIG. 13 Flowchart showing an operation of the image output apparatus 101 during white-balance adjustment.

FIG. 13 is a flowchart showing an operation of the image output apparatus 101 during a white-balance adjustment process.

Figure 14:
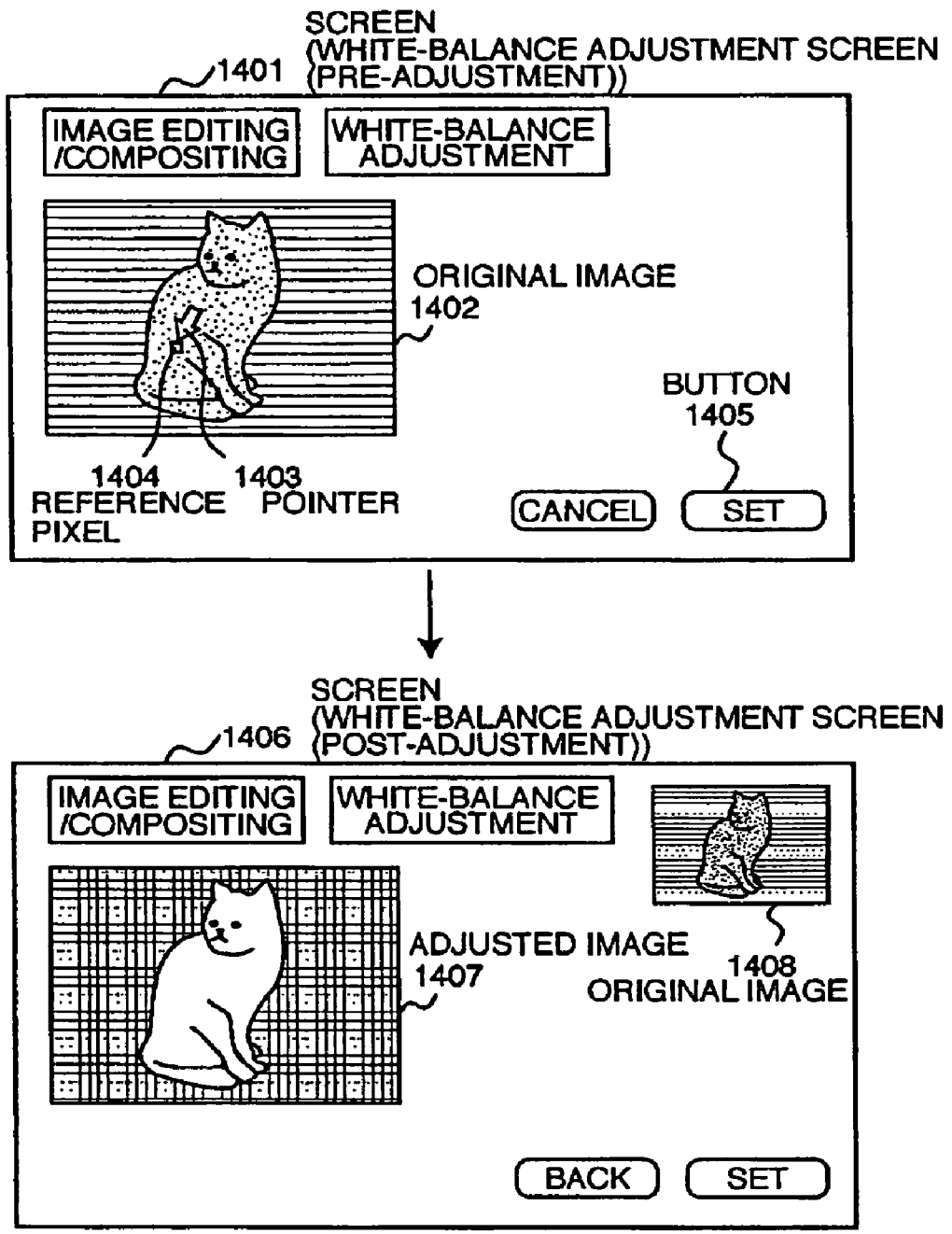
FIG. 14 Diagram showing a flow of a process performed by the image output apparatus 101 in relation to white-balance adjustment.

FIG. 14 is a diagram showing the flow of the processing of the image output apparatus 101 during a white-balance adjustment process.

The image output apparatus 101 (control unit 301) displays a white-balance adjustment screen 1401 (pre-adjustment) in the image processing process (FIG. 6: Step 603). In the white-balance adjustment screen 1401, the original image 1402, a pointer 1403 for designating the reference pixel 1404, a button 1405 for performing white-balance adjustment, and the like are displayed.

The image output apparatus 101 calculates the color difference between the reference pixel data and the achromatic pixel data (Step 1302) after the reference pixel 1404 which is to be achromatic (gray) is designated by the pointer 1403 and a white-balance adjustment execution instruction is received from the button 1405 "Set" (Step 1301). Then, the image output apparatus performs white-balance adjustment of the entire original image data based on the calculated color difference, and the adjusted image 1407 is displayed with the original image 1408 on the white-balance adjustment screen 1406 (post-adjustment) on the monitor (Step 1303).

The image output apparatus 101 adjusts the color of the entire original image so as to set gray-balance without changing the brightness of the reference pixel.

The image output apparatus 101 calculates the color difference between the reference pixel data and the achromatic pixel data when a reference pixel to be achromatic (gray) is designated, and performs white-balance adjustment on the entire original image based on this color difference.

In this way, the user designates only the reference pixel to be achromatic (gray), and the image output apparatus 101 performs white-balance adjustment on the entire original image, based on the color difference between the reference pixel data and the actual achromatic pixel data. Therefore, the operation load related to white-balance adjustment placed on the user can be reduced and the desired color adjustment can be actualized.

Next, an operation of the image output apparatus 101 during the image processing process (FIG. 6: Step 603) is described with reference to FIG. 15 to FIG. 20.

Figure 15:
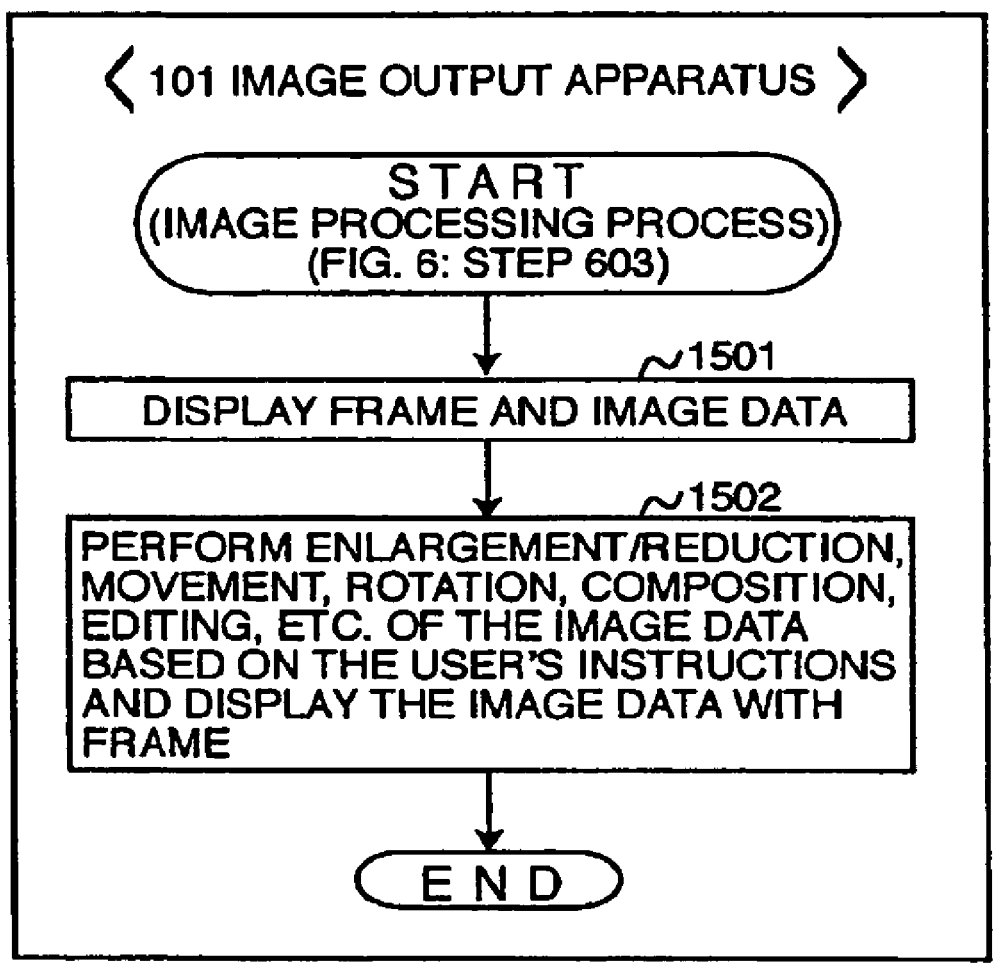
FIG. 15 Flowchart showing an operation of the image output apparatus 101 during image processing.

FIG. 15 is a flowchart showing an operation of the image output apparatus 101 in the image processing process.

Figure 16:
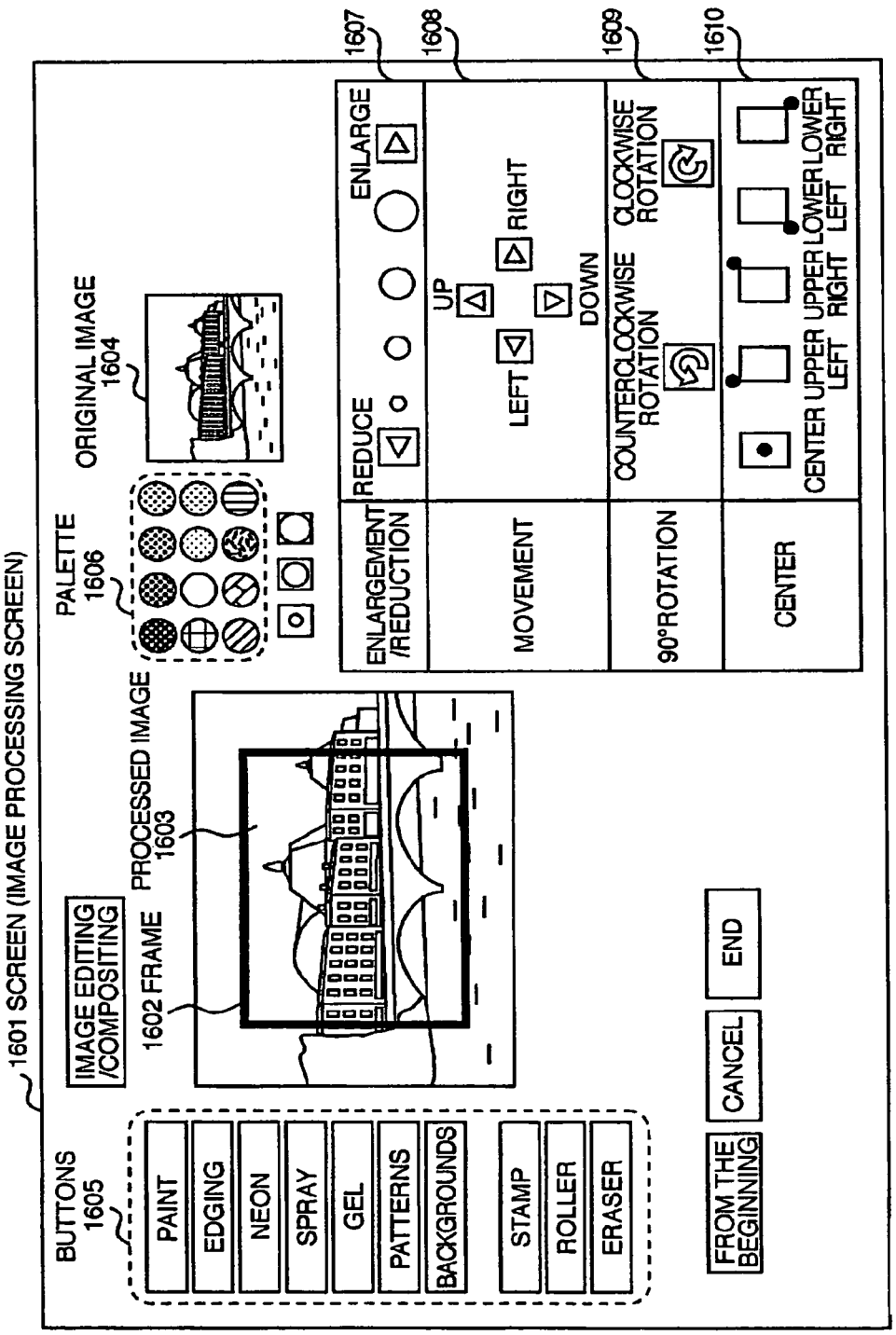
FIG. 16 Diagram showing an example of an image processing screen 1101 displayed by the image output apparatus 101.

FIG. 16 is a diagram showing an example of the image processing screen 1601 displayed by the image output apparatus 101.

The image output apparatus 101 (control unit 301) displays the image processing screen 1601 on the monitor (Step 1501). On the image processing screen 1601, a frame 1602 indicating the printing area, a processed image 1603, an original image 1604, buttons 1605 for performing operational instructions, a palette 1606 for specifying color, pattern thickness of a pen, etc., an enlargement/reduction button 1607, a movement button 1608, a rotation button 1609, a center setting button 1610, and the like are displayed.

The image output apparatus 101 performs enlargement/reduction, movement, rotation, inversion, composition, editing, etc. of the image, and displays this with the frame 1602 (Step 1502). The user processes the original image on the abovementioned processing screen 1601, and prints the image. The section of the processed image which goes over the frame may or may not be displayed.

Figure 17:
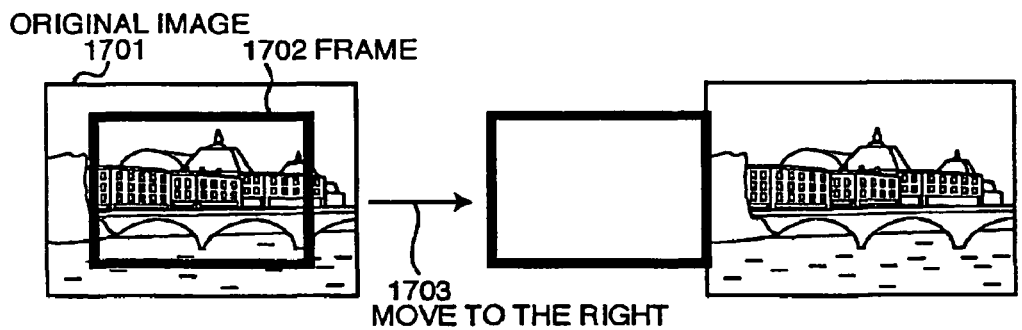
FIG. 17 Diagram showing the flow of an image movement process.

FIG. 17 is a diagram showing the flow of an image movement process.

The image output apparatus 101 can move the image to the very border of the image, even when the original image 1701 goes over the frame 1702 when moving.

Figure 18:
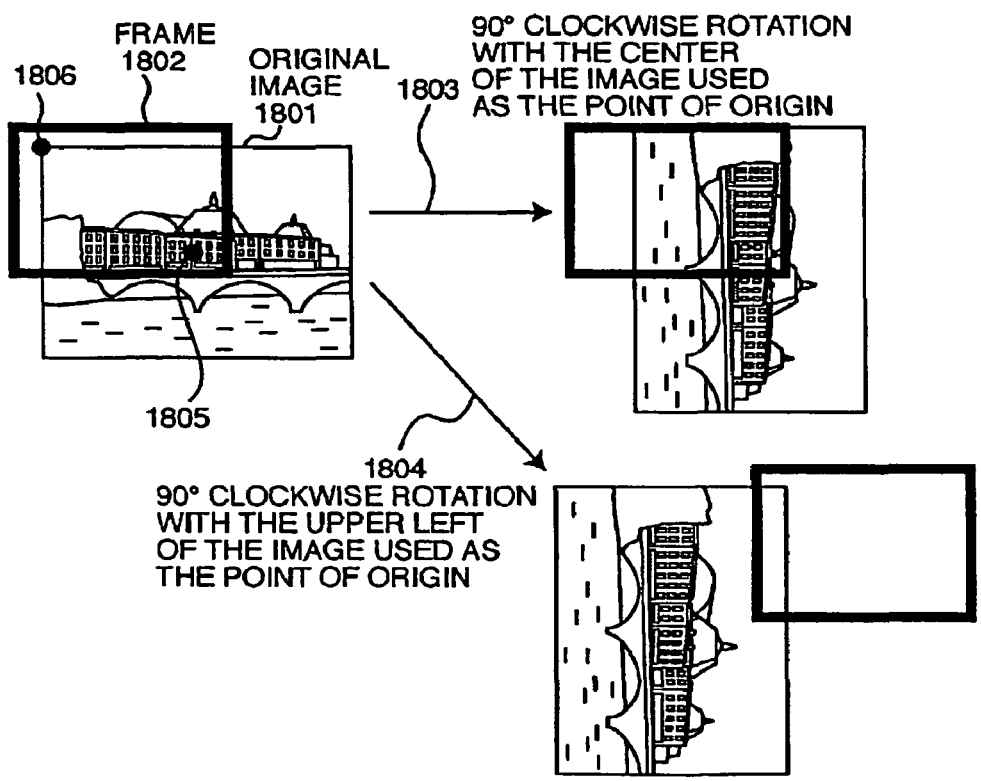
FIG. 18 Diagram showing the flow of an image rotation process.

FIG. 18 is a diagram showing the flow an image rotation process.

The image output apparatus 101 can rotate (90° rotation to the right, etc.) the original image 1801 with the image center 1805 used as the center (point of origin) (Step 1803), rotate the image with the corner of the image (upper left apex 1806, etc.) used as the point of origin (Step 1804), and display this with the frame 1802.

Figure 19:
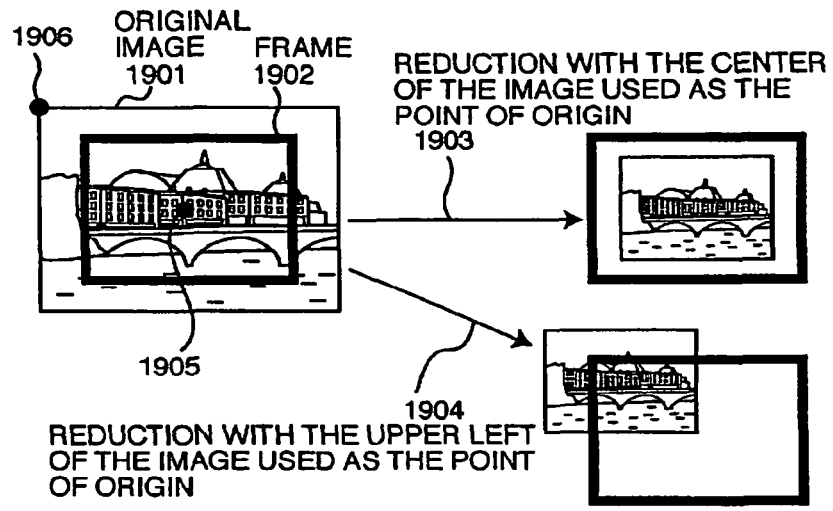
FIG. 19 Diagram showing the flow of an image enlargement and reduction process.

FIG. 19 is a diagram showing the flow of an image enlargement/reduction process.

The image output apparatus 101 can enlarge/reduce the original image 1801 with the image center 1805 as the center (point of origin) (Step 1903), enlarge/reduce the image with the corner of the image (upper left apex 1906, etc.) used as the point of origin (Step 1904), and display this with the frame 1902.

Figure 20:
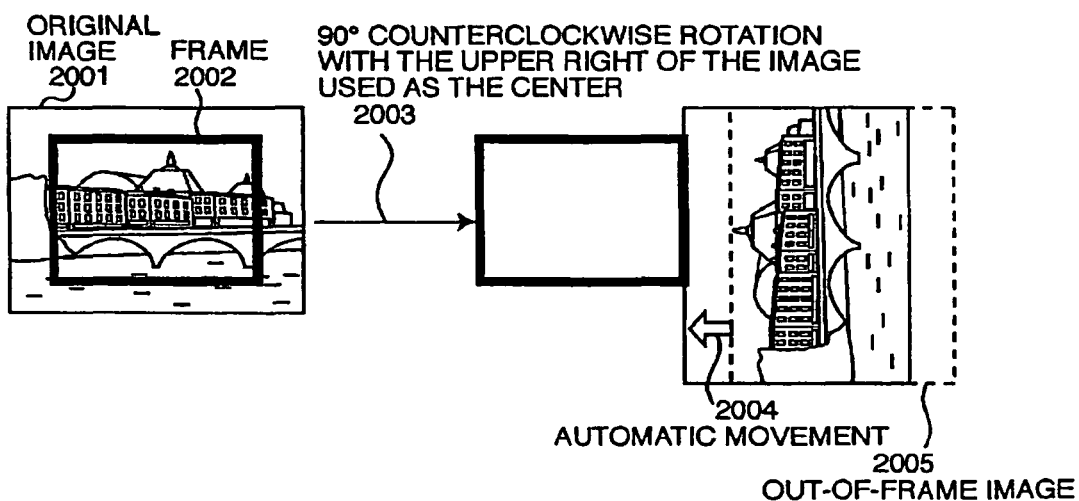
FIG. 20 Diagram showing a flow of a process performed when the entire image goes completely over a frame.

The FIG. 20 is a diagram showing the flow of the process when the entire image completely goes over the frame.

The image output apparatus 101 performs a process (rotation, etc.) on the original image (Step 2003), and if the entire image completely goes over the frame 2002, the image is moved to the frame position automatically (Step 2004). As shown in FIG. 20, for example, the image output apparatus 101 automatically moves the out-of frame image 2005 to a position where the border of the frame 2002 and the border of the image are circumscribed.

In this way, the image output apparatus can move the image to an inside position near the edge when the image goes over the frame when moving, can set the center, reference, or the like for rotation/inversion (for example, the center, the upper-left, each side, an arbitrary point, etc. of the image), can set the point of origin of enlargement/reduction (for example, the center, the upper-left, an arbitrary point, etc. of the image), and automatically move the image to the frame position when the entire image goes off the frame as a result of rotation/inversion/reduction/etc. Thus, the operability of the image operation screen during image editing process, composition process, and processing process can be improved.

Next, the configuration of the image output apparatus 101-2 according to a second embodiment of the present invention is described with reference to FIG. 21.

Figure 21:
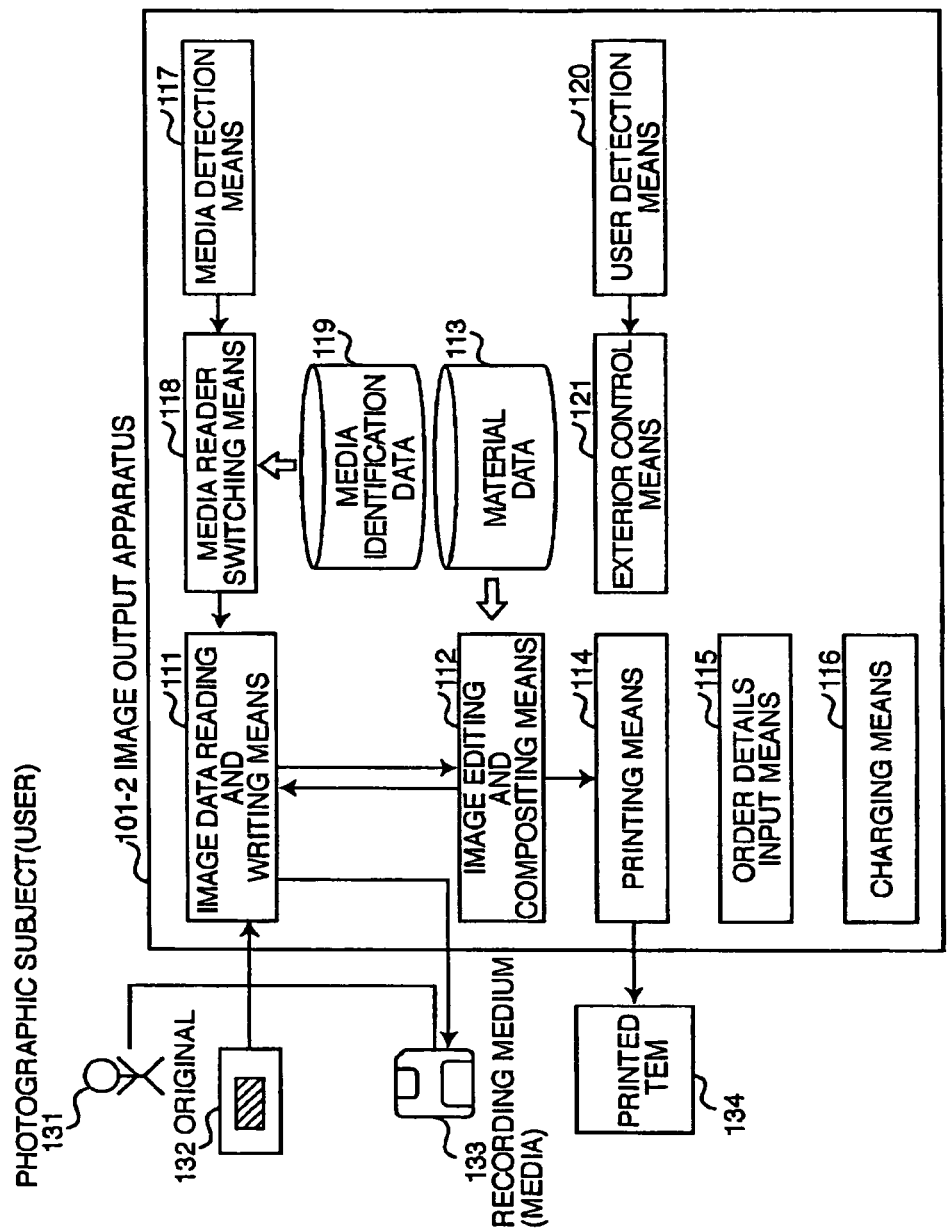
FIG. 21 Block diagram showing a configuration of an image output apparatus 101-2 according to a second embodiment of the present invention.

FIG. 21 is a block diagram showing the configuration of the image output apparatus 101-2 according to the second embodiment of the present invention.

The image output apparatus 101-2 comprises an image data reading and writing means 111, an image editing and compositing means 112, a material database 113, a printing means 114, an order details input means 115, a charging means 116, a media detection means 117, a media reader switching means 118, a media reader identification database 119, a user detection means 120, an exterior control means 121, etc.

The image data reading and writing means 111, the image editing and compositing means 112, the material database 113, the printing means 114, the order details input means 115, the charging means 116, the subject 131 (user), the original 132, recording medium 133 (media), the printed item 134, and the like shown in FIG. 21 are the same as those shown in FIG. 1, and descriptions thereof are omitted.

The media detection means 117 detects the media brought in by the user. The media detection means is, for example, a CCD (Charge Coupled Device) camera for scanning and acquiring the shape of the media (outer image) or a barcode reader for reading a barcode attached to the media.

The imaging device (digital camera, etc.), scanner, and the like provided in the image output apparatus 101-2 can be used as the media detection means 117.

The media reader switching means 118 performs identification of the type of input media as required, and switches the media reader according to the type of input media. The media readers are recording medium data input devices such as various card readers and various drive devices, and can have not only an input (reading) function, but also an output (writing) function, etc.

The type of input media can be directly specified by the user himself. Alternatively, the type of input media can be specified through an operation of acquiring media shape (outer image) or barcode information by the media detection means 117, and identifying the media type based on the media identification data in the media identification database 119. Furthermore, the media type can be identified from the image data recording device (model of the digital camera owned by the user, etc.) designated by the user himself.

The media identification data is information correlating the media shape (outer image), barcode information, and image data recording device (model of digital camera, etc.) with the media type.

The user detection means 120 detects whether or not a user of an image output apparatus 101-2 is present. Various sensors can be used as the user detection means 120. For example, the entering and exiting of the user and the like can be detected by an infrared sensor.

The exterior control means 121 controls the exterior state (optical transparency, etc.). The exterior is all or a part of the entrance door (push/pull-type, sliding-type, automatic door, etc.), curtains, wall surface, ceiling, and the like of the image output apparatus 101-2. The exterior control means 121 makes all or a part of the exterior opaque when the entrance of a user is detected by the user detection means 120, and transparent when the exiting of the user is detected.

A light-control glass which transitions between a transparent state (visible state) and an opaque state (not-visible state), for example, can be implemented in the exterior. The light-control glass is a glass which can be switched between a transparent state (visible state) and an opaque state (not-visible state) according to applied voltage (turning on and turning off of the applied voltage, etc.). In addition, a liquid crystal panel or the like may be implemented.

Next, the outer configuration of the image output apparatus 101-2 is described with reference to FIG. 22.

Figure 22:
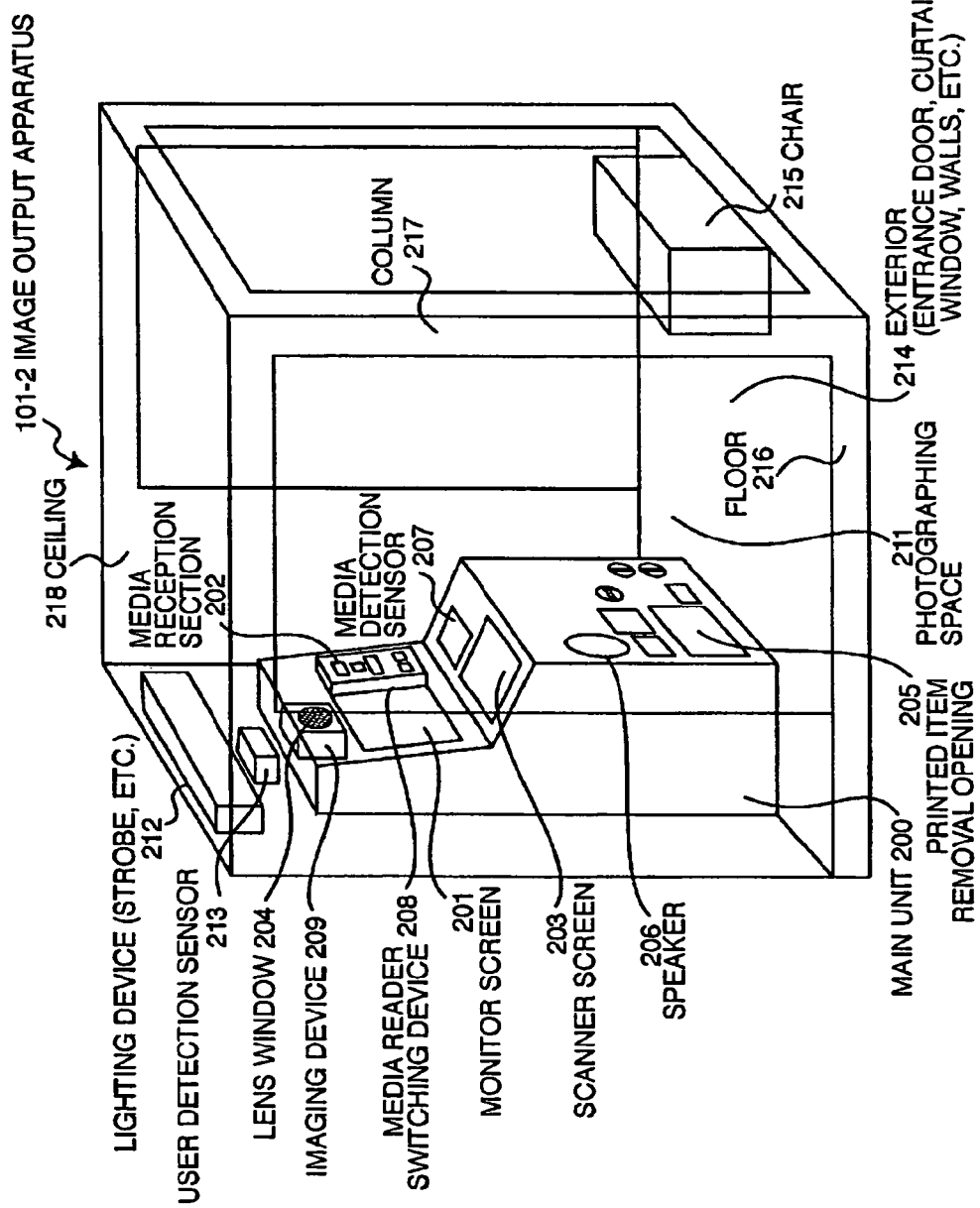
FIG. 22 Outer perspective view of the image output apparatus 101-2.

FIG. 22 is an outer perspective view of the image output apparatus 101-2.

The image output apparatus 101-2 comprises a photographing space 211 which is surrounded by a box-shaped frame. The main unit 200 of the image output apparatus 101-2 is placed on one side thereof.

Within this photographing space 211, a lighting device 212 (strobe, etc.), the user detection sensor 213 (infrared sensor, etc.), a chair 215, etc. are provided.

This box-shaped frame comprises an exterior 214, a floor 216, a pillar 217, etc. The exterior 214 is the entrance door (push/pull-type, sliding-type, automatic door, etc.), curtains, windows, walls, etc.

The monitor screen 201, the media reception section 202, the scanner surface 203, the lens window 204, the printed item removal opening 205, the speakers 206, etc. shown in FIG. 22 are the same as those shown in FIG. 2, and therefore, descriptions thereof are omitted.

The media detection sensor 207 for reading the media shape (outer image) or the media barcode information is placed next to the scanner surface 203. The identification of the media type can be performed based on the shape of this media (outer image) or the barcode information of the media.

The media reader switching device 208 selects the media reader according to the media type of the user, and switches to an insertion opening which can be used in the media reception section 202. The media reader switching device 208 is described hereafter.

The imaging device 209 is a device for photographing the subject (user), and for example, is a digital camera.

In addition, although this is not shown, a personal computer including a control section for controlling respective constituent parts, a power supply box for performing voltage conversions, an uninterruptible power source device for preventing damage to the CPU, hard disk, etc. of the control section during a power outage, and the like (not shown) are placed within the main unit 200.

Next, the hardware configuration of the image output apparatus 101-2 is described with reference to FIG. 23.

Figure 23:
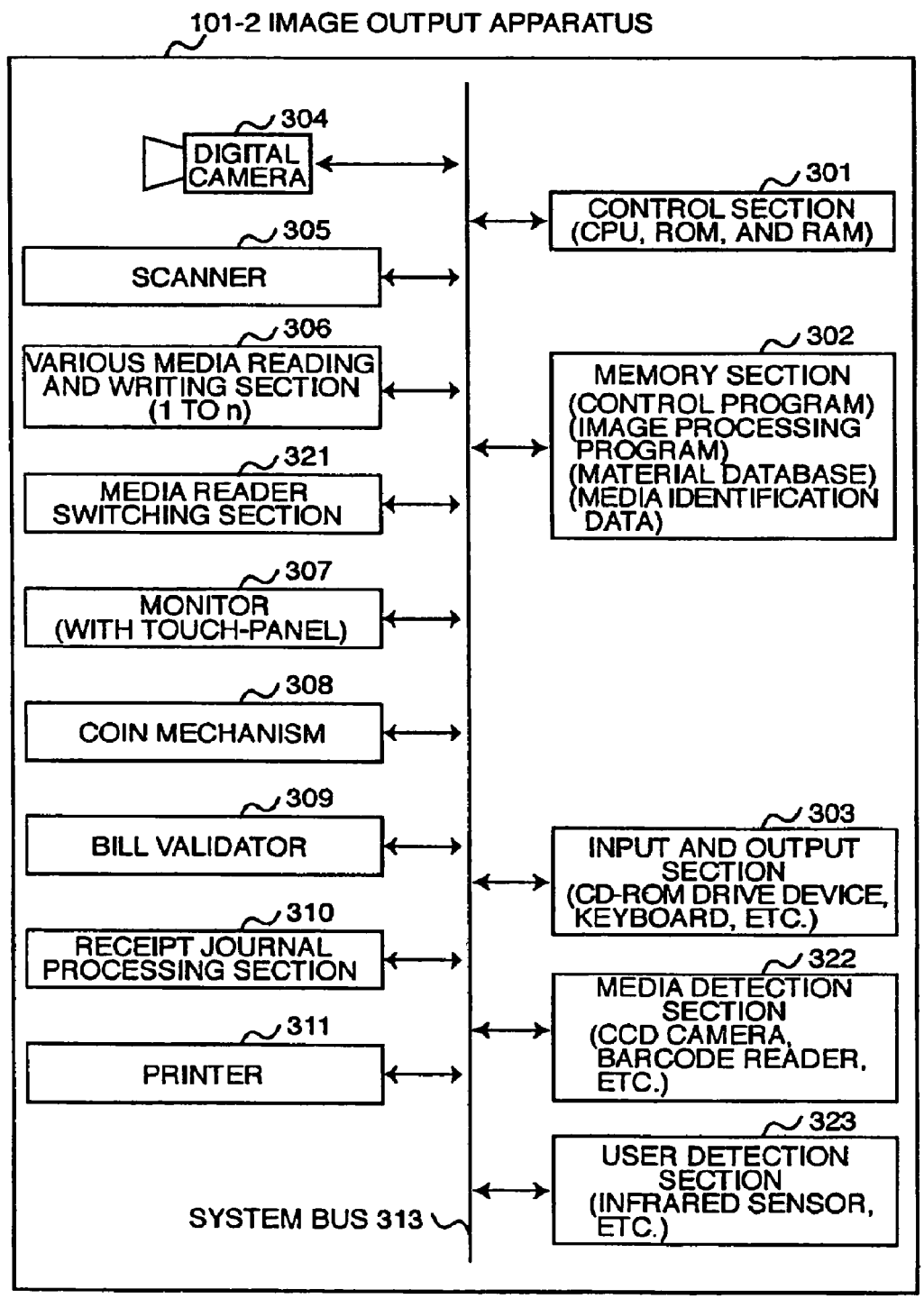
FIG. 23 Hardware configuration diagram of the image output apparatus 101-2.

FIG. 23 is a hardware configuration diagram of the image output apparatus 101-2.

In the image output apparatus 101-2, a control section 301, a memory section 302, an input and output section 303, a digital camera 304, a scanner 305, various media reading and writing sections 306 (1 to n), a monitor 307 (with a touch-panel), a coin mechanism 308, a bill validator 309, a receipt journal processing section 310, a printer 311, a media reader switching section 321, a media detection section 322, a user detection section 323, and the like are connected via a system bus 313.

The control section 301 comprises a CPU, ROM, RAM, and the like. The control section 301 drive-controls each device connected via the system bus 313 according to a program stored in the memory section 302, which is a hard disk or the like serving as a large-capacity memory medium.

Programs for drive-controlling each constituent part, for example, a reading and writing program corresponding to each recording medium, a media type identification program, a media reader switching control program, a charging program, and the like, are stored in the memory section 302. In addition, an image processing program for editing and processing an inputted or selected image as a section of the input editing and compositing means 112, an image processing program for creating thinning-out data and creating index data, and a program for displaying an interactive-type menu on the monitor 307 as a section of the order details input means 115, setting printing conditions to the printing means 114, and instructing the start of printing are stored in the memory section 302. Furthermore, a material database 113 to which image data, such as frames used for image composition, background images, line illustration images for coloring, etc. are stored, a media identification database 119 which is referenced to identify media type, various setting data, and the like are also stored in the memory section 302.

The program codes are read from the control section 301 as required, transferred to the RAM, and read by the CPU so as to be executed as various means.

The input and output section 303, the digital camera 304, the scanner 305, the various media reading and writing sections 306 (1 to n), the monitor 307 (with a touch-panel), the coin mechanism 308, the bill validator 309, the receipt journal processing section 310, the printer 311, the system bus 313, and the like shown in FIG. 23 are the same as those shown in FIG. 3. Therefore, descriptions thereof are omitted.

The media reader switching section 321 corresponds to the media reader switching means 118 and switches the media reader according to the media type. The switching of the media reader is described hereafter.

The media detection section 322 corresponds to the media detection means 117 and acquires the shape of the user's medium (outer image), barcode information, etc., by a CCD camera, a barcode reader, etc.

The user detection section 323 corresponds to the user detection means 120 and detects the entering and exiting of the user into and from the photographing space by an infrared sensor, etc.

Next, an operation of the image output apparatus 101-2 is described with reference to FIG. 24.

Figure 24:
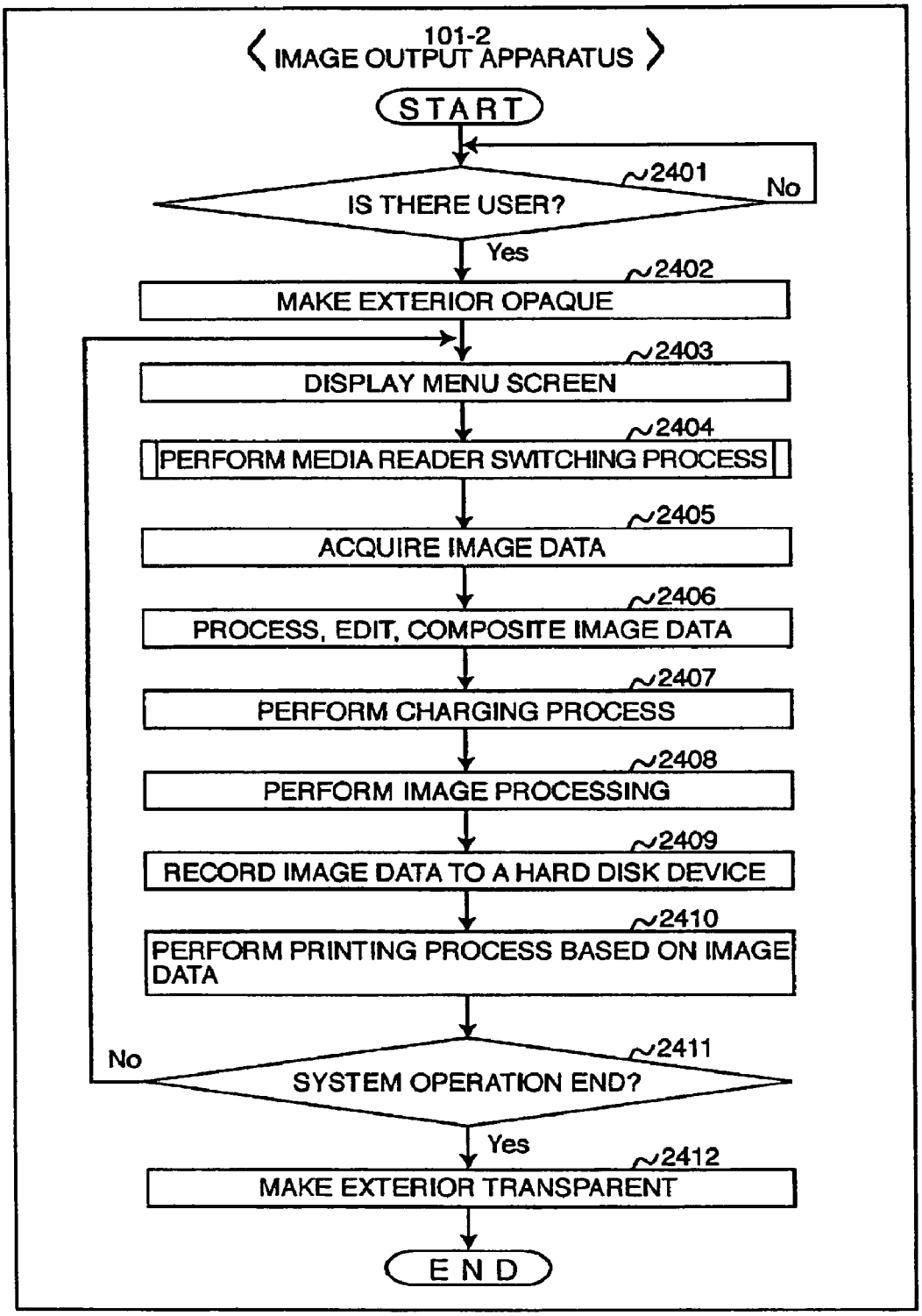
FIG. 24 Flowchart showing an operation of the image output apparatus 101-2.

FIG. 24 is a flowchart showing the operation of the image output apparatus 101-2.

The image output apparatus 101-2 determines whether a user is present by an infrared sensor, etc. and makes the exterior opaque (Step 2402) if a user has entered (Yes in Step 2401).

The image output apparatus 101-2 displays a menu screen showing service details, procedures, guides, etc. and requests that the user make selections (Step 2403).

When inputting image data, the user can select a method, such as reading from a recording media, reading from a scanner, or photographing a subject by an imaging device (digital camera and the like). When reading out from the recording medium is selected, the image output apparatus 101-2 identifies the recording medium type and switches the media reader (Step 2404). The image output apparatus 101-2 acquires the image data via the media reader (Step 2405).

The image output apparatus 101-2 performs processing, editing, compositing, etc. of the image based on instructions from the user (Step 2406). Processing, editing, and compositing of the image are, for example, compositing input image data together, compositing with a frame image, compositing with existing images and the like, coloring, inputting text, moving, enlarging and reducing, creating postcard data, and the like.

The image output apparatus 101-2 performs a charging process and a receipt issuing process according to the details of the user's order (output mode (photograph print, sticker print, index print, postcard print, etc.), number of prints, and the like) (Step 2407).

The image output apparatus 101-2 performs image processing such as color correction, resizing, trimming, layout, text and logo composition (Step 2408), holds the image-processed image data in a hard disk device, etc. (Step 2409), and transmits the image data to a printing device which is in a output-ready state, and performs a printout process (Step 2410).

If the operation of the image output apparatus 101-2 is continued (No, in Step 2411), the image output apparatus 101-2 repeats the processes in Step 2403 to Step 2411.

If the operation of the image output apparatus 101-2 is completed or if the user is no longer present such as by exiting, etc. (Yes, in Step 2411), the exterior is made transparent (Step 2412).

Next, the configuration of the media reader switching device 208 is described with reference to FIG. 25 to FIG. 32.

Hereinafter, a media reader switching device 2501 (FIG. 25 to FIG. 27), a media reader switching device 2801 (FIG. 28 to FIG. 30), and a media reader switching device 901 (FIG. 31 and FIG. 32) are described as embodiments of the media reader switching device 208.

Figure 25:
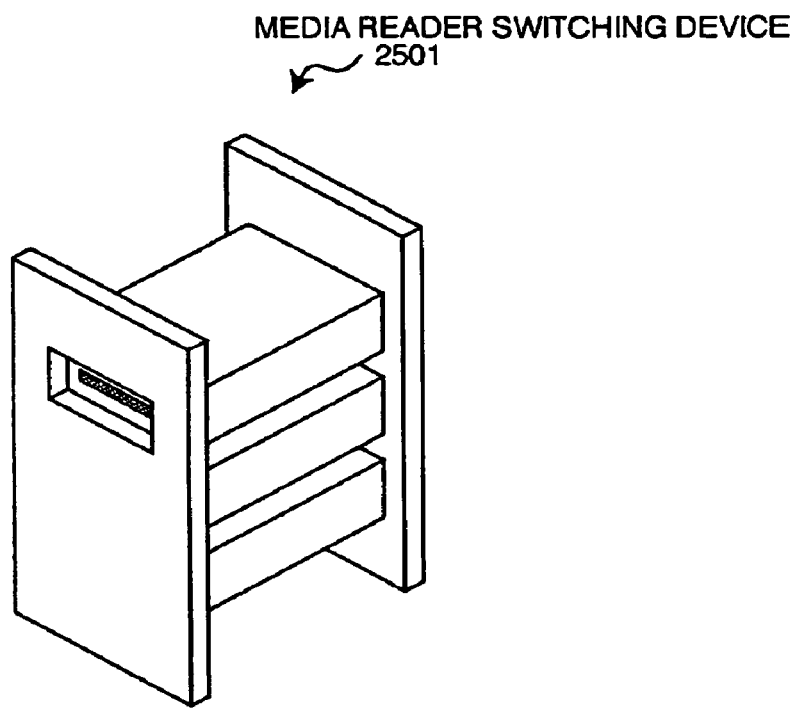
FIG. 25 Outer perspective view of a media reader switching device 2501.

FIG. 25 is an outer perspective view of the media reader switching device 2501.

Figure 26:
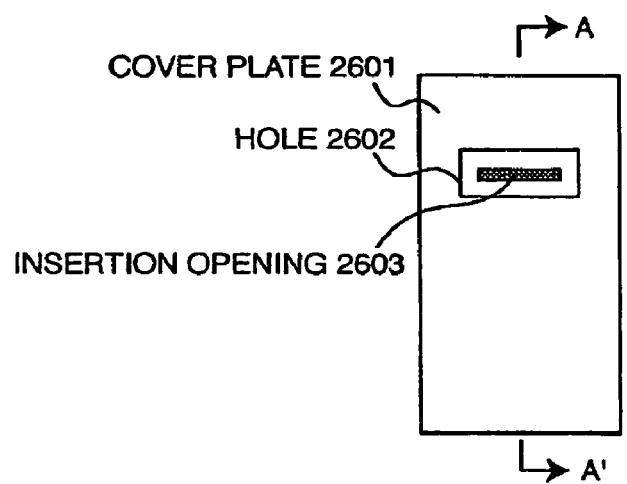
FIG. 26 Front view of the media reader switching device 2501.

FIG. 26 is a front view of the media reader switching device 2501.

Figure 27:
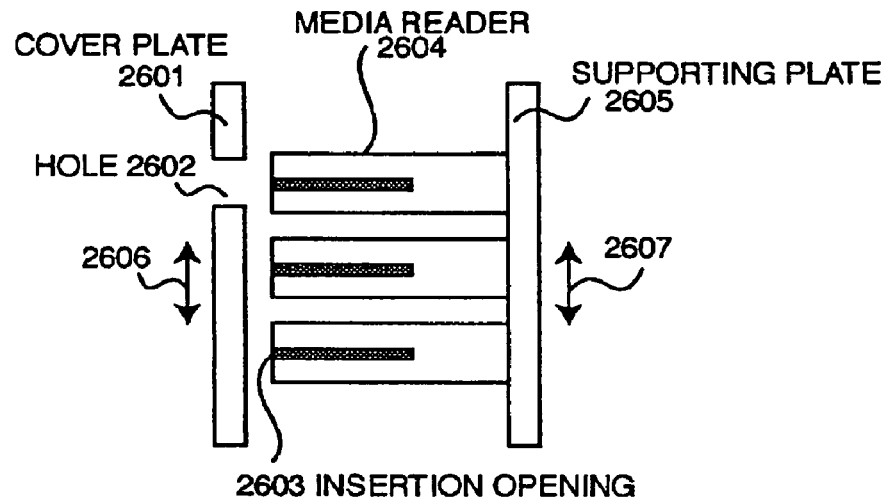
FIG. 27 Cross-sectional view taken along line A-A' in FIG. 26.

FIG. 27 is a cross-sectional view of line A-A' in FIG. 26.

The media reader switching device 2501 is operation-controlled by the control section 301 of the image output apparatus 101-2.

The front surface of the media reader switching device 2501 is covered by a cover plate 2601 which has a hole 2602. This cover plate 2601 comprises the media reception section 202. The user inserts a media into the insertion opening 2603 of the media reader 2604 via the hole 2602. The shape and size of the hole 2602 are set so that only one of the insertion openings 2603 of the media readers 2604 can be used.

The back-ends of the various media readers 2604 are aligned in a row in the vertical direction on a supporting plate 2605 and joined thereto.

The cover plate 2601 and/or the supporting plate 2605 can be moved in the vertical direction (direction of arrow 2606 or the direction of arrow 2607). Various linear drive devices can be used to drive the cover plate 2601 and the supporting plate 2605.

With regards to the cover plate 2601 and the supporting plate 2605, the media readers do not necessarily have to be aligned in the vertical direction and be driven in the vertical direction. Various alignment methods are possible according to the shape, housing capacity, etc., of the main unit 200 of the image output apparatus 101-2.

In addition, the supporting plate which supports the media readers does not necessarily have to be provided in the back-ends of the media readers. The structure of the supporting plate and the method for joining the media reader to the support plate is not limited thereto, if all the media readers can be moved integrally.

The media reader switching device 2501 selects the media reader 2604 corresponding to the media type, drives the cover plate 2601 and/or the supporting plate 2605, and moves the insertion opening 2603 of the selected media reader 2604 to the position of the hole 2602 of the cover plate 2601.

Figure 28:
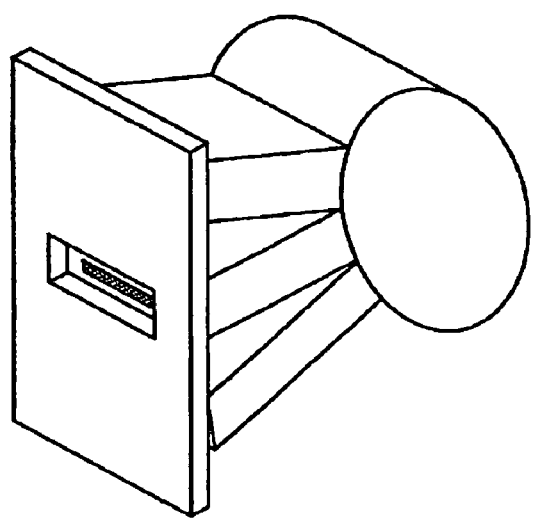
FIG. 28 Outer perspective view of a media reader switching device 2801.

FIG. 28 is an outer perspective view of the media reader switching device 2801.

Figure 29:
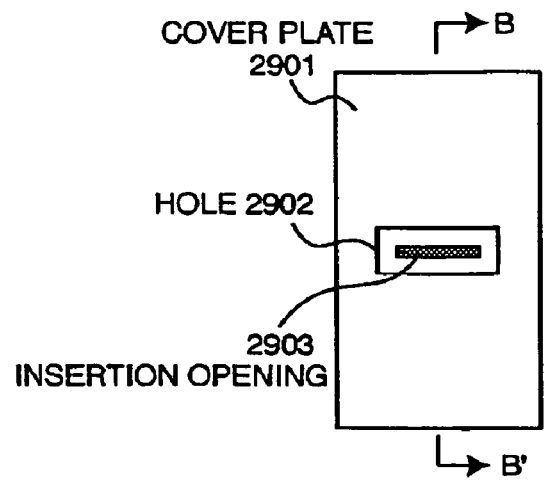
FIG. 29 Front view of the media reader switching device 2801.

FIG. 29 is a front view of the media reader switching device 2801.

Figure 30:
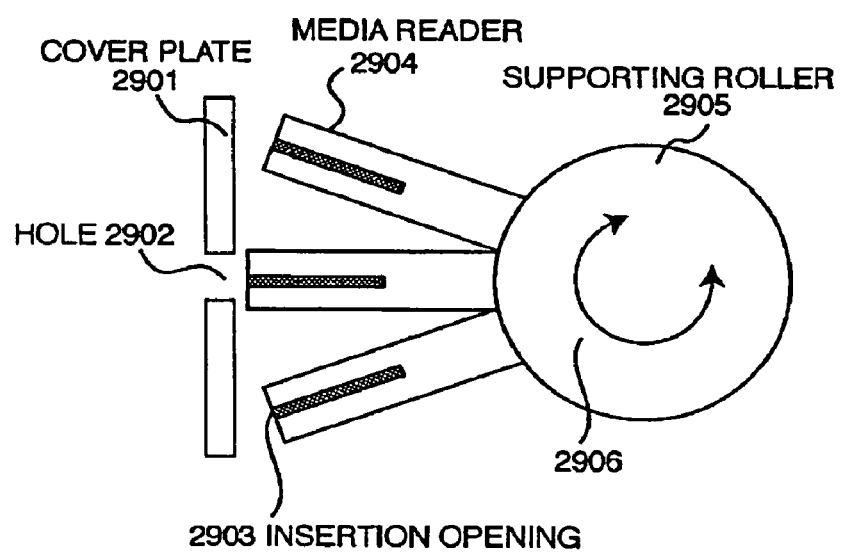
FIG. 30 Cross-sectional view taken along line B-B' in FIG. 29.

FIG. 30 is a cross-sectional view of line B-B' in FIG. 29.

The media reader switching device 2801 is operation-controlled by the control section 301 of the image output apparatus 101-2.

The front surface of the media reader switching device 2801 is covered by a cover plate 2901 which has a hole 2902. This cover plate 2901 constitutes the media reception section 202. The user inserts a media into the insertion opening 2903 of the media reader 2904 via the hole 2902. The shape and size of the hole 2902 is set so that only one of the insertion openings 2903 of the media readers 2904 can be used.

The back-ends of the various media readers 2904 are aligned on the outer circumference of a supporting roller 2905 and joined thereto.

The supporting roller 2905 can be rotated in the direction of the arrow 2906. Various rotation devices can be used to drive the supporting roller 2905.

The media reader switching device 2801 selects the media reader 2904 corresponding to the media type, rotates the supporting roller 2905, and moves the insertion opening 2903 of the selected media reader 2904 to the position of the hole 2902 of the cover plate 2901.

The supporting roller which supports the media readers does not necessarily have to be provided in the back-end of the media readers. The structure of the supporting roller and the method of joining the media reader to the support roller is not limited thereto, if each media reader can be rotated and moved integrally.

Figure 31:
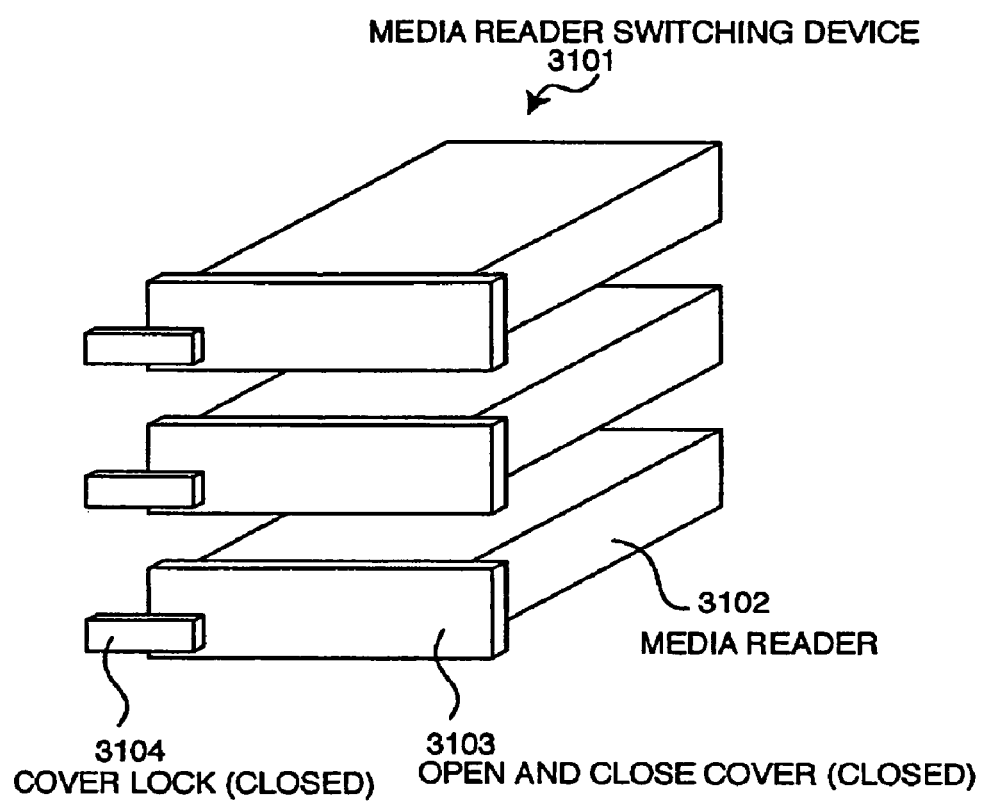
FIG. 31 Outer perspective view of a media reader switching device 3101.
Figure 32:
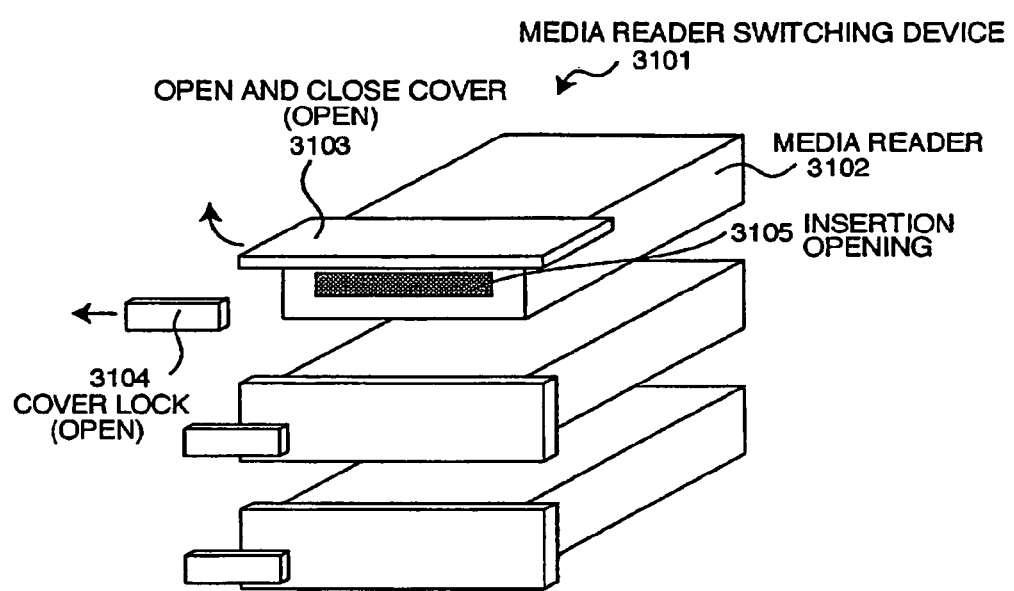
FIG. 32 Front view of the media reader switching device 3101.

FIG. 31 and FIG. 32 are outer perspective views of the media reader switching device 3101.

The media reader switching device 3101 is operation-controlled by the control section 301 of the image output apparatus 101-2.

The media reader switching device 3101 is provided with an open and close cover 3103 (shutter) for every media reader 3102. Each open and close cover 3101 respectively opens and closes the insertion opening of the corresponding media reader.

A cover lock 3104 is provided for each open and close cover 3103 and can slide in the horizontal direction. When closing the insertion opening 3105 of the media reader 3102, the cover lock 3104 slides to the right-hand direction and fixes the open and close cover 3103. When opening the insertion opening 3105 of the media reader 3102, the cover lock 3104 slides to the left-hand direction and releases the fixed open and close cover 3103.

As shown in FIG. 31, the open and close covers 3103 of the media readers 3102 are all closed other than during the insertion and removal of the media (during insertion, during removal, etc.), and media cannot be inserted or removed, regardless of the media type.

As shown in FIG. 32, during the insertion and removal of the media (during insertion, during removal, etc.), the insertion opening 3105 of the media reader 3102 corresponding to the selected media is opened and the media can be inserted and removed. However, the insertion openings of the other media readers are closed by the cover lock and insertion and removal of the media cannot be performed.

At the time of unlocking, the open and close cover 3103 may be manually opened and closed, or automatically opened and closed.

When the open and close cover 3103 is automatically opened and closed according to the opening and closing of the insertion opening 3105 of the media reader 3102, it is not always necessary to provide the cover lock 3104.

Next, an operation of the image output apparatus 101-2 during a media reader switching process (FIG. 4: Step 404) is described with reference to FIG. 33 and FIG. 34.

Figure 33:
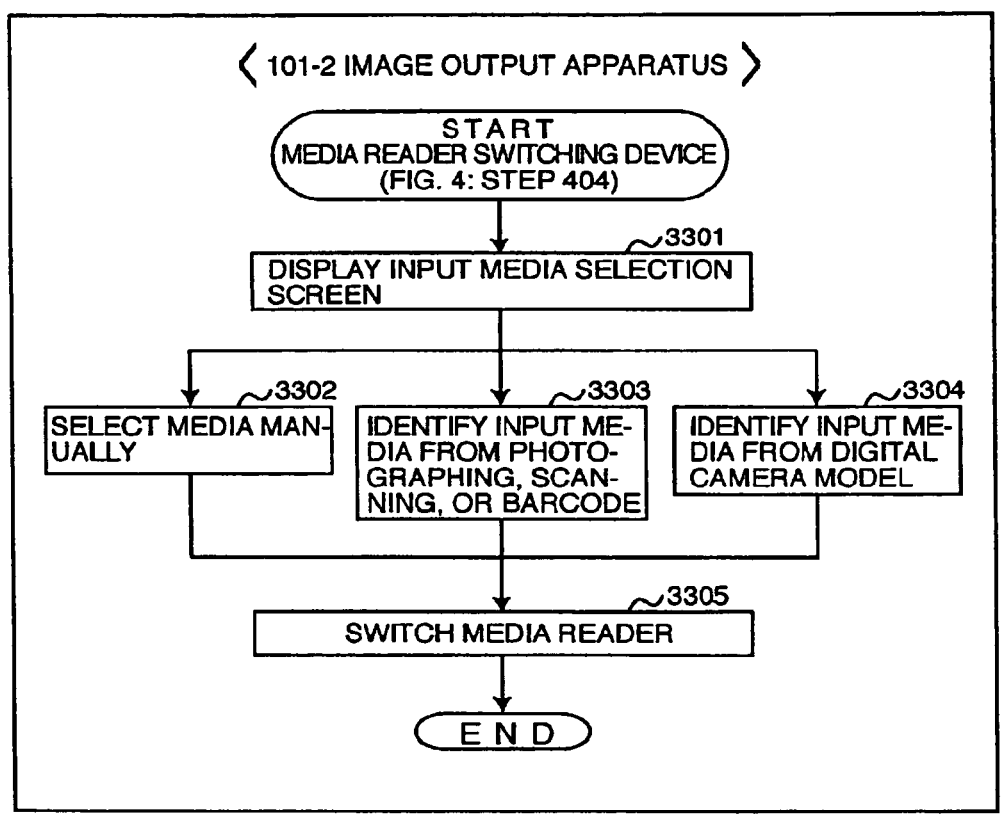
FIG. 33 Flowchart showing an operation of the image output apparatus 101-2 during a media reader switching process.

FIG. 33 is a flowchart showing the operation of the image output apparatus 101-2 during a media reader switching process.

Figure 34:
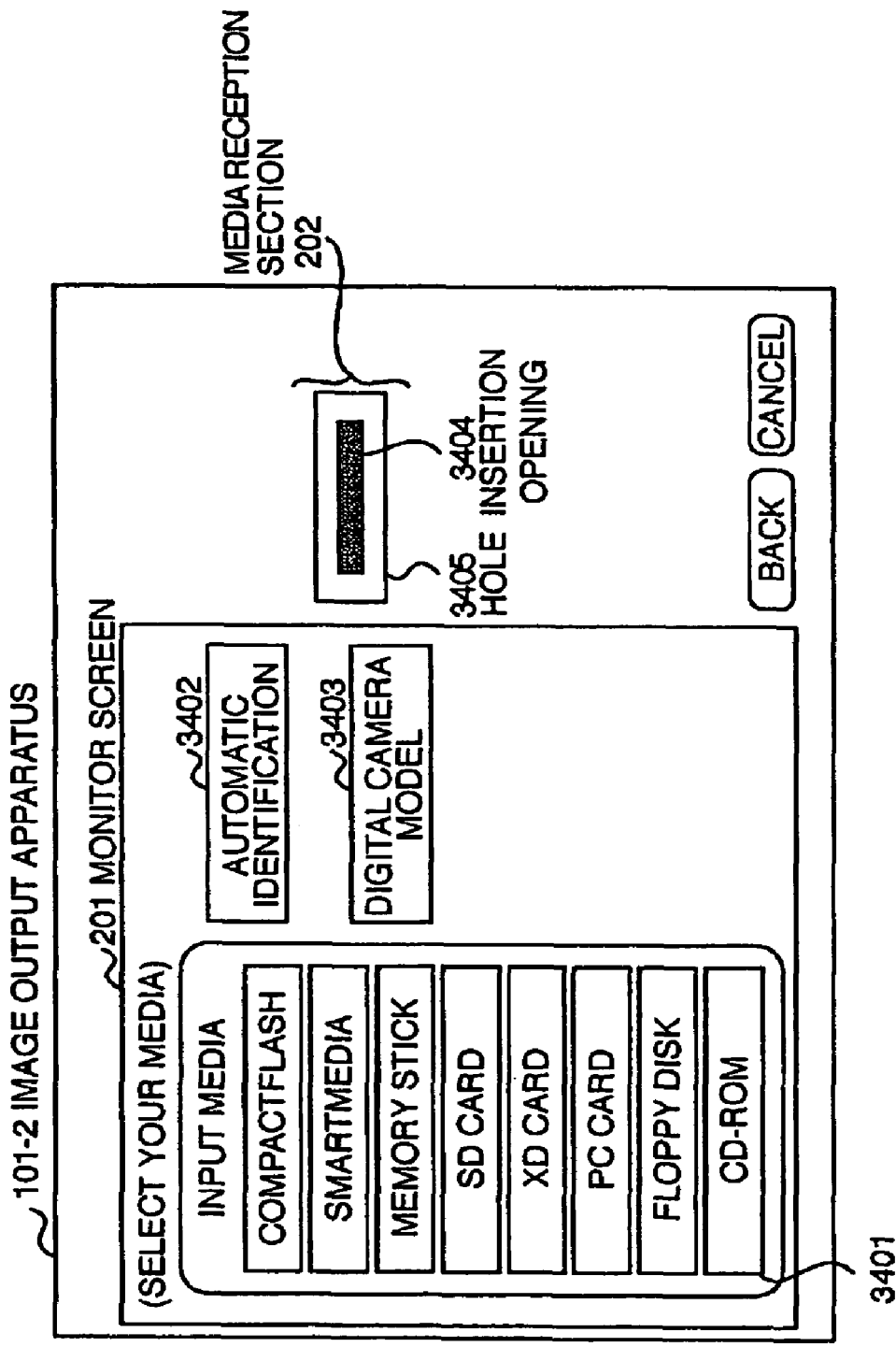
FIG. 34 Diagram showing an example of a monitor screen 201, media reception section 202, etc. of the image output apparatus 101-2 during the media reader switching process.

FIG. 34 is a diagram showing an example of the monitor screen 201, the media reception section 202, etc. of the image output apparatus 101-2 during a media reader switching process.

The image output apparatus 101-2 (control section 301) displays an input media selection screen on the monitor screen 201. The image output apparatus 101-2 (control section 301) identifies, selects, and sets the user's media type (Step 3302, Step 3303, and Step 3304), and switches to a media reader corresponding to the selected media type (Step 3305).

The selection and setting of the media type can be selected by the user himself on the monitor screen 201 (Step 3302). For example, when the user touches the button 3401 "CD-ROM" on the touch-panel monitor screen 201, "CD-ROM" is selected and set as the input media. Furthermore, the selected and set media can be displayed on the monitor screen or indicated by voice.

In addition, the selection and setting of the media type can be made based on the shape of the user's media (outer image) or the barcode information attached to the media (Step 3303). In this case, when the user places the media near the scanner surface 203, the lens window 204, or the media detection sensor 207 and touches the button 3402 "Automatic identification" on the touch-panel monitor screen 201, the image output apparatus 101-2 (control section 301) acquires the shape of the media (outer image) or the barcode information and identifies the media type based on the media identification data (data for relating the media type with the media shape or barcode information) held in the memory section 302. Furthermore, the identified media can be displayed on the monitor screen or indicated by voice.

Furthermore, the selection and setting of the media type can be made by the specification of the model of the device which created the media (a digital camera owned by the user, etc.) or the like (Step 3304). For example, when the user touches the button 3403 "Digital camera model" on the touch-panel monitor screen 201, the image output apparatus 101-2 (control section 301) displays a list of digital camera models (not shown). When the user specifies a digital camera model, the image output apparatus 101-2 (control section 301) identifies the media type based on the media identification data (data corresponding the media type with the digital camera model) held in the memory section 302. Furthermore, the identified media can be displayed on the monitor screen or indicated by voice.

The image output apparatus 101-2 does not necessarily have to comprise an independent media detection sensor 207. Media detection (acquisition of media shape (outer image) and barcode information) can be performed by the lens window 204 [imaging device 209 (digital camera, etc.) or the scanner surface 203].

Although FIG. 25 to FIG. 32 have been described in relation to the media reader switching mechanism, for example, when implementing the media reader switching device 2501 (FIG. 25 to FIG. 27) or the media reader switching device 2801 (FIG. 28 to FIG. 30), the image output apparatus 101-2 (control section 301) moves the insertion opening 3404 of the media reader corresponding to the selected media type to the position of the hole 3405 of the media reception section 202.

In this way, the image output apparatus 101-2 allows only the use of the insertion opening of the selected media reader by the media reader switching device 208 (501, 701, 901, etc.). Therefore, the user can be accurately guided to the insertion opening for the selected recording medium. Insertion error of the recording medium, damage to the reading device and the recording medium due to insertion error, accidents such as deletion of data, and the occurrence of unexpected situations can be prevented. In addition, operability can be improved and smooth-use facilitated.

In addition, because only the insertion opening of the media reader corresponding to the media type can be used, dust-proofing, dirt-proofing and tamper-proofing can be achieved, thereby improving failure-resistance properties and maintainability of the image output apparatus.

In addition, only a device which simply rotates (moves) vertically or horizontally need be provided as the foregoing media reader switching device 208. Because the structure is simple, usability can be enhanced at an extremely low cost.

In addition, if the device is designed to simply rotate (move) vertically or horizontally, an increase in insertion openings can be accommodated by merely changing the movement range, and modification or the like of the entire device is not required. Therefore, cost can be reduced and future changes can be accommodated flexibly.

In addition, because the media reader switching device 2801 shown in FIG. 28 to FIG. 30 comprises a rotating supporting roller, the addition of media readers can be accommodated flexibly. In this case, the media reader is simply newly connected to the rotating supporting roller.

When the foregoing media reader switching device is not provided, a sensor (not shown) may be provided at the insertion openings of each media reader so as to detect the size of the media about to be inserted into the insertion opening. When the user mistakenly attempts to insert a small media into a large insertion opening, a warning sound can be generating from the speaker 206.

In this case, the user can prevent insertion error of the recording medium, damage to the reading device and the recording medium due to insertion error, accidents such as deletion of data, and the occurrence of unexpected situations.

In addition, the foregoing technology can be applied to devices other than the image output apparatus. For example, if the device, equipment, etc. is that which can read data from a plurality of media types, the foregoing technology can be applied even when they do have an image data output function.

Figure 35:
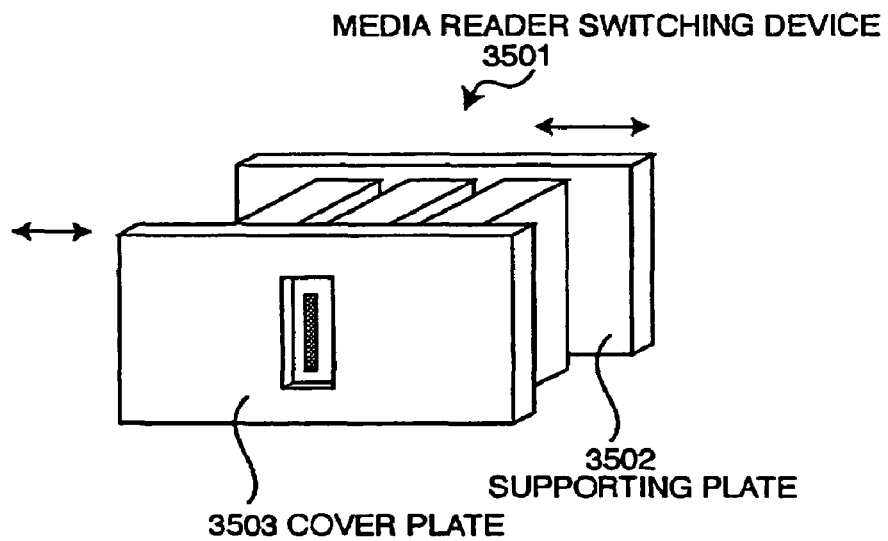
FIG. 35 Outer perspective view of a media reader switching device 3501.

FIG. 35 is an outer perspective view of the media reader switching device 3501 (208).

Figure 36:
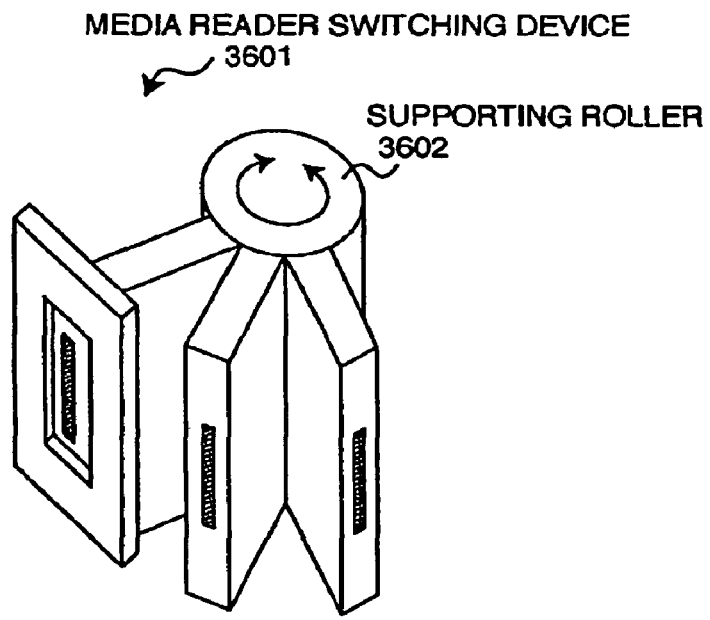
FIG. 36 Outer perspective view of a media reader switching device 3601.

FIG. 36 is an outer perspective view of the media reader switching device 3601 (208).

In the media reader switching devices shown in FIG. 25 to FIG. 30, the media insertion opening is provided horizontally. However, as shown in FIG. 35 and FIG. 36, the media insertion opening can be provided vertically. In this case, the media reader switching device performs media reader switching by means of a structure for rotation or movement in the left-right direction (horizontal direction).

The media reader switching device 3501 shown in FIG. 35 performs media reader switching by moving the supporting plate 3502 or the cover plate 3503 in the horizontal direction.

The media reader switching device 3601 shown in FIG. 36 performs media reader switching by rotating the supporting roller 3602 in the horizontal direction.

Next, exterior state control (FIG. 4: Step 401, Step 402, Step 412, etc.) is described with reference to FIG. 37 and FIG. 38.

Figure 37:
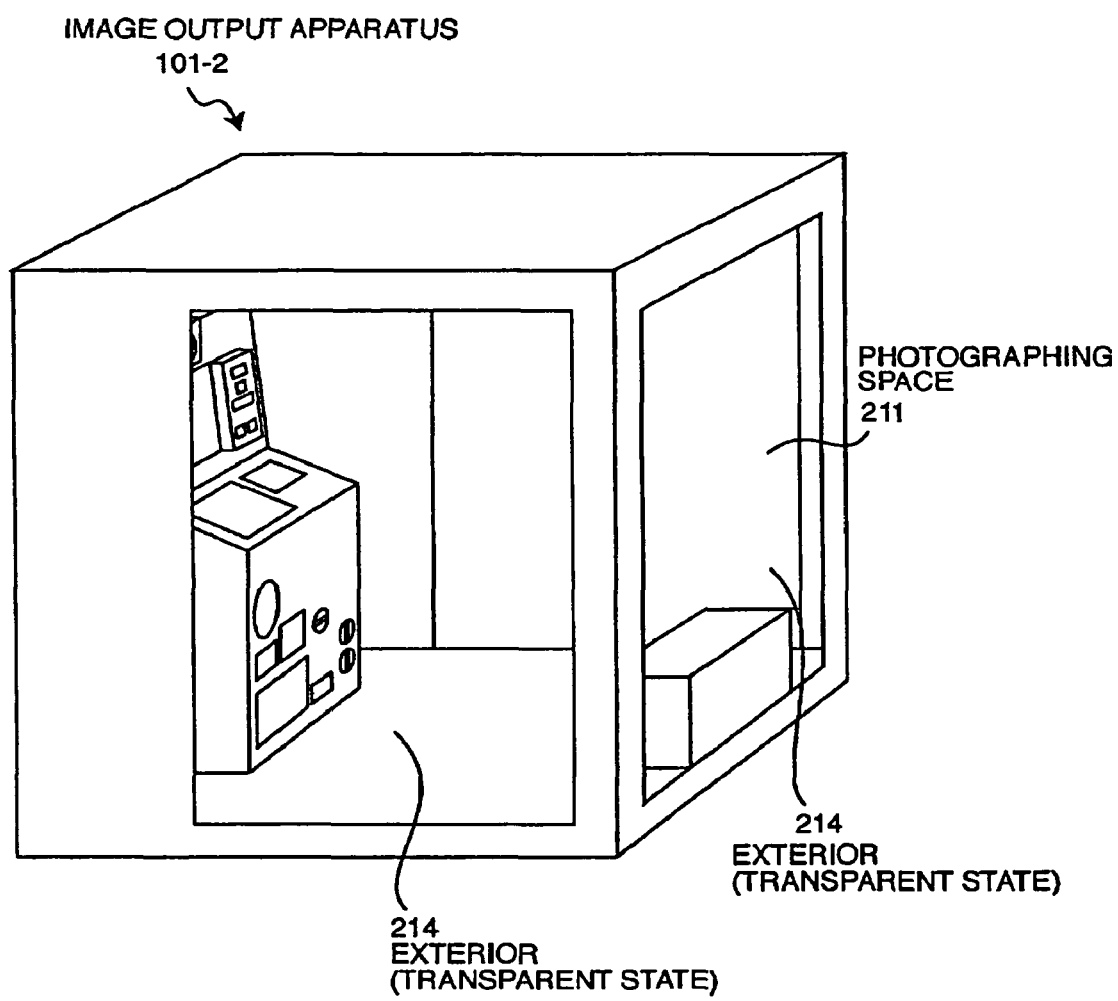
FIG. 37 Diagram showing the state of the exterior of the image output apparatus 101-2 when there is no user.

FIG. 37 is a diagram showing the state of the exterior of the image output apparatus 101-2 when no user is present.

Figure 38:
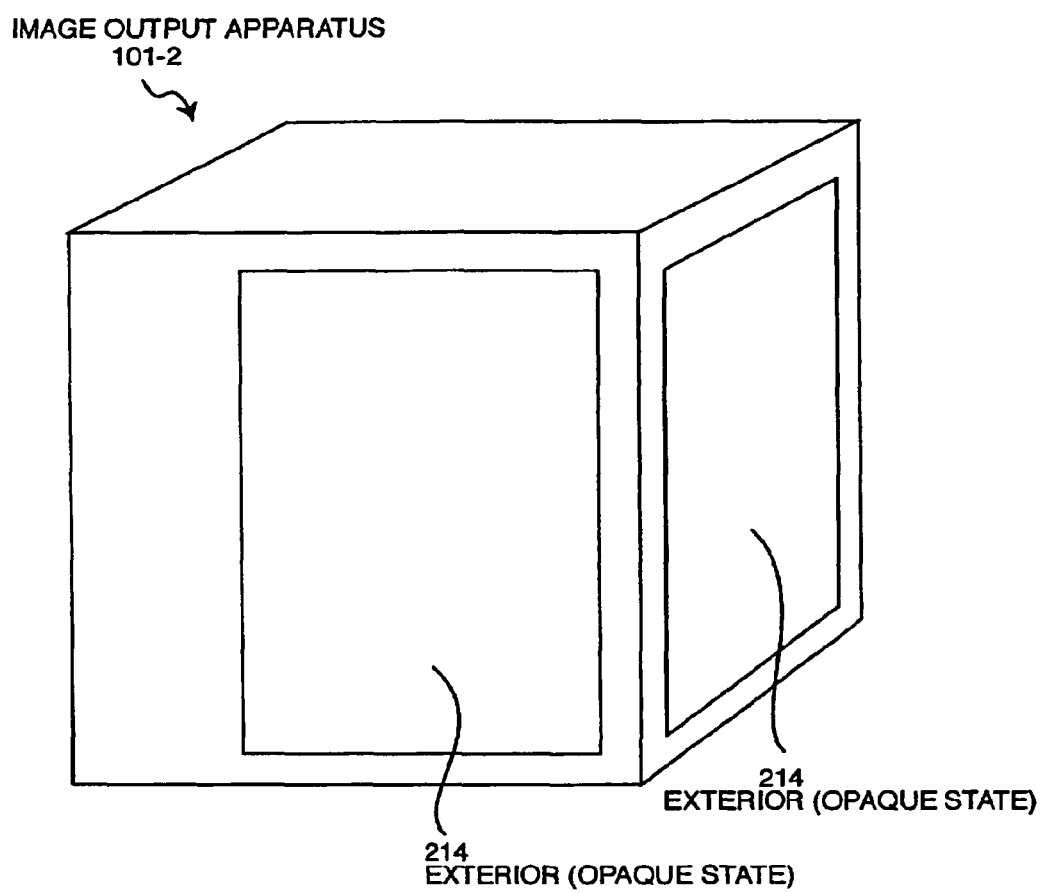
FIG. 38 Diagram showing the state of the exterior of the image output apparatus 101-2 when there is a user.

FIG. 38 is a diagram showing the state of the exterior of the image output apparatus 101-2 when a user is present.

The exterior state control is controlled by the control section 301 of the image output apparatus 101-2.

The image output apparatus 101-2 determines whether or not a user is present in the photographing space 211 by a user detection sensor 213 (infrared sensor, etc.) (Step 401). If a user is present within the box, the exterior becomes opaque (Step 402). If no user is present within the box, the exterior becomes transparent (Step 412).

As shown in FIG. 37, if no user is present within the box of the image output apparatus 101-2, the exterior 214 becomes transparent and the state of the photographing space 211 can be seen clearly from the outside. In this case, it can be ascertained even from a distance that the image output apparatus 101-2 can currently be used.

As shown in FIG. 38, if a user is present within the box of the image output apparatus 101-2, the exterior 214 becomes opaque and the state of the photographing space 211 can not be seen at all from the outside. In this case, it can be ascertained even from a distance that the image output apparatus 101-2 is currently in use. At the same time, the user within the box of the image output apparatus 101-2 can secure a private environment when photographing.

In this way, the image output apparatus 101-2 determines the presence or the absence of a user within the box and controls the transparent state and opaque state of the exterior according to the presence or the absence of a user. Therefore, device monitoring during the absence of a user can be facilitated, thereby enhancing the effect of security. In addition, a private environment can be secured when photographing. Furthermore, because whether or not the device is in use can be accurately ascertained from the outside, the occurrence of unexpected situations can be prevented and operability can be improved.

It is possible to prevent the occurrence of unexpected situations, such as a situation in which a user thinks that the apparatus is in use because the curtain is closed but no person is present inside the apparatus. Therefore, the operability of the image output apparatus can be improved.

In addition, when the aforementioned light-control glass exterior and the like is implemented on the entrance door (push/pull-type, sliding-type, automatic door, etc.), the user can secure a private environment during photographing without opening and closing curtains. Furthermore, there is no need to perform complicated operations such as the opening and closing of the curtains, and the aforementioned ill-effects of the opening and closing of the curtains are not generated.

When the exterior is made transparent, it can be clear and colorless or clear and colored. Furthermore, patterns, images, videos, text, advertisements, etc. can be displayed as well. The display of colored and clear images and the like can be actualized by the use of a liquid crystal panel or the like.

In this case, the aesthetic quality of the image output apparatus can be enhanced, and in combination with the advertising effect, the use of the image output apparatus can be promoted.

As described above, according to the embodiments of the present invention, the image output apparatus can configure various settings based on the system environment, the wishes of the manager, installer, operator, user, and the like. Thus, the operational flexibility of the image output apparatus can be enhanced and the operability thereof can be improved, as well.

In addition, the image output apparatus can configure detailed settings related to the movement, rotation, inversion, enlargement, reduction, etc. of an image in the editing process, composition process, and processing process of the image. Thus, the operability of the image operation screen can be improved.

In addition, the image output apparatus holds the settings of the image correction values for each image correction pattern in advance and performs image correction based on the image correction values set and held in advance when an image correction pattern is selected. Thus, the operational load of image correction placed on the user can be reduced.

In addition, the image output apparatus performs image processing on the entire original image based on the reference pixel data designated by the user. Thus, the operational load of image adjustment placed on the user can be reduced and the desired image adjustment can be achieved.

In addition, the image output apparatus allows only the use of the insertion opening of the media reader selected by the media reader switching device or the like, and in addition, controls the transparent state and the opaque state of the exterior according to the presence and absence of a user within the box. Thus, prevention of the occurrence of unexpected situations due to false recognition (false recognition of media type, false recognition of the presence or absence of a user within the box, etc.), and in addition, the facilitation of smooth use and the like can be provided.

The image output apparatus can display a list of image data based on simplified image data (thumbnail image data or reduced image data) within the image data file and can display detailed images based on the detailed image data (ordinary image data, actual image data, etc.) within the image data file. In this case, for example, the EXIF format which holds simplified image data and actual image data in one file or the like can be used as the format type of the image data file.

In addition, the image output apparatus can comprise each means (FIG. 1, FIG. 21, etc.) and each device (FIG. 3, FIG. 23, etc) integrally, or a portion thereof can be separated and connected by a connection line (cable or the like, which may be wired or wireless), network (dedicated line, LAN, the internet, etc., which may be wired or wireless).

In addition, the image output apparatus can perform guidance through screen display, and additionally, guidance through voice, video, etc.

In addition, programs for performing the foregoing processes can be held in a recording medium, such as a CD-ROM, and distributed, or these programs can be transmitted and received via a communication circuit.

Although the preferred embodiments of the image output apparatus and the like according to the present invention has been described above, with reference to the attached drawings, the present invention is not limited to these examples. It is clear that various alternative embodiments and modifications falling within the scope of technical ideas disclosed in the present application are conceivable by persons skilled in the art, and it is understood that these alternative embodiments and modifications also fall within the technical scope of the present invention.

The invention claimed is:

1. An image output apparatus comprising:
   an image data reading section for inputting image data from a recording media, each of the image data including reduced image data and actual image data;
   a printer for printing out the image data;
   a control section for displaying an image list display including a plural of selectable images based on the reduced image data, a detailed image display including a detail image of the selected image based on the actual image data, and an enlarged image display including an enlarged image of the selected image based on the reduced image data on a screen;
   a selecting section operable by a user for selecting one of the selectable images of the image list display so as to switch the image list display to the detail image display of the selected image;
   a memory section for holding setting data which indicates whether or not to enlarge and temporarily display the reduced image data when transitioning from the image list display to the detailed image display of the selected image; and
   wherein, when the temporary display of the reduced image data is not performed based on the setting data, the control section switches directly from the image list display to the detailed image display after the completion of the creation of the detailed image from the actual image data, and when the temporary display of the reduced image data is performed based on the setting data, the control section switches from the image list display to the enlarged image of the selected image then switches to the detailed image display after the completion of the creation of the detailed image from the actual image data.

2. An image output method for an image output apparatus comprising an image data reading section for inputting image data from a recording media, a printer for printing out the image data, a control section for displaying an image list display including a plural of selectable images based on the reduced image data, a detailed image display including a detail image of the selected image based on the actual image data, and an enlarged image display including an enlarged image of the selected image based on the reduced image data on a screen, and a memory section for holding setting data, the method comprising:
   inputting image data from the recording media, each of the image data including reduced image data and actual image data;
   selecting one of the selectable images of the image list display by a user so as to switch the image list display to the detail image display of the selected image;
   inputting the setting data which indicates whether or not to enlarge and temporarily display the reduced image data when transitioning from an image list display including a plural of selectable image to a detailed image based on the actual image to a detailed image display including a detail image of the selected image based on the actual image data;
   switching directly from the image list display to the detailed image display after the completion of the creation of the detailed image from the actual image data, when the temporary display of the reduced image data is not performed based on the setting data; and
   switching from the image list display to the enlarged image of the selected image then switching to the detailed image display after the completion of the creation of the detailed image from the actual image data.

* * * * *